United States Patent [19]

Portanova et al.

[11] Patent Number: 4,992,934
[45] Date of Patent: Feb. 12, 1991

[54] REDUCED INSTRUCTION SET COMPUTING APPARATUS AND METHODS

[75] Inventors: Gregory A. Portanova; Brian J. Sprague, both of Enfield, Conn.

[73] Assignee: United Technologies Corporation, Hartford, Conn.

[21] Appl. No.: 504,055

[22] Filed: Mar. 30, 1990

Related U.S. Application Data

[63] Continuation of Ser. No. 941,450, Dec. 15, 1986.

[51] Int. Cl.$^5$ .............................................. G06F 9/40
[52] U.S. Cl. ............................. 364/200; 364/232.23; 364/232.3; 364/240.2
[58] Field of Search ... 364/200 MS File, 900 MS File

[56] References Cited

U.S. PATENT DOCUMENTS

| | | | |
|---|---|---|---|
| 4,434,462 | 2/1984 | Guttag et al. | 364/200 |
| 4,498,135 | 2/1985 | Caudel | 364/200 |
| 4,514,801 | 4/1985 | Caudel et al. | 364/200 |
| 4,514,805 | 4/1985 | McDonough et al. | 364/200 |
| 4,569,016 | 2/1986 | Hao et al. | 364/200 |
| 4,577,282 | 3/1986 | Caudel et al. | 364/200 |
| 4,587,612 | 5/1986 | Fisk et al. | 364/200 |
| 4,589,065 | 5/1986 | Auslander et al. | 364/200 |
| 4,589,087 | 5/1986 | Auslander et al. | 364/768 |
| 4,608,634 | 8/1986 | Caudel et al. | 364/200 |
| 4,638,426 | 1/1987 | Chang et al. | 364/200 |
| 4,719,568 | 1/1988 | Carrubba et al. | 364/200 |
| 4,727,480 | 2/1988 | Albright et al. | 364/200 |

OTHER PUBLICATIONS

A VSLI RISC, by Patterson et al, IEEE Computer, Sep. 1982, pp. 8-18.
The 801 Minicomputer, by Radin, IBM J. Res. Develop., vol. 27, No. 3, May 1983, pp. 237-246.
Byington, L., Theis, D., "Air Force Standard 1750A ISA Is the New Trend", *IEEE Computer*, Nov. 1986, pp. 50-59.
"Keeping an Eye on a Circuit Explosion", *Electronic Design*, Oct. 30, 1986.
Tabak, D., "Which System Is a RISC?", *IEEE Computer*, Oct. 1986, pp. 85, 86.
Fox, E. R., Kiefer, K. J., Vangen, R. F., Whalen, S. P., "Reduced Instruction Set Architecture for a GaAs Microprocessor System", *IEEE Computer*, Oct. 1986, pp. 71-81.
Rasset, T. L., Niederland, R. A., Lane, J. H., Geideman, W. A., "A 31-bit RISC Implemented in Enhancement-Mode JFET GaAs", *IEEE Computer*, Oct., 1986, pp. 60-68.
Meng, "Airborne Architecture Standard Holds On", *Digital Design*, Oct. 1986, pp. 24, 25.
Silvey, A., Milutinovic, Mendoza-Grado, V., "A Survey of Advanced Microprocessors and HLL Computer Architectures", *IEEE Computer*, Aug. 1986, pp. 72-85.
Colwell, R. P., Hitchcock, III, C. Y., Jensen, E. D., Sprunt, H. M. Brinkley, Kollar, C. P., "Computers, Complexity, and Controversy", *IEEE Computer*, Sep. 1985, pp. 8-19.
Ohr, S., "RISC Machines", *Electronic Design*, Jan. 10, 1985, pp. 175-190.
Patterson, D. A., "Reduced Instruction Set Computers", *Communications of the ACM*, Jan. 1985, vol. 28, No. 1, pp. 8-21.
Hennesy, J. L., "VLSI Processor Architecture", *IEEE Transactions on Computers*, vol. C-33, No. 12, Dec. 1984, pp. 1221-1245.
Ungar, D., Blau, R., Foley, P., Samples, D., Patterson, D., "Architecture of SOAR: Smalltalk on a RISC", 11th Annual Symposium on Computer Architecture, Jun. 4-7, 1984, Ann Arbor, Mich.
Wulf, W. A., "Compilers and Computer Architecture", *IEEE Computer*, Jul. 1981, pp. 41-47.

*Primary Examiner*—Michael R. Fleming
*Assistant Examiner*—Debra A. Chun
*Attorney, Agent, or Firm*—Francis J. Maguire, Jr.

[57] ABSTRACT

A reduced instruction set computer (RISC) with a Harvard architecture is disclosed. The RISC may be designed to be used simply as a RISC or may be designed to be used to emulate a complex instruction set computer (CISC). Or, it may be designed for use as either. A CISC design methodology is disclosed whereby a RISC is designed and fabricated and whereby RISC emulation code is written concurrently with design and fabrication and also subsequent to fabrication.

11 Claims, 6 Drawing Sheets

REDUCED INSTRUCTION SET COMPUTING APPARATUS AND METHODS

This is a continuation of application Ser. No. 06/941,450, filed Dec. 15, 1986, now abandoned.

DESCRIPTION

1. Technical Field

The present invention relates to computers and, more particularly, to reduced instruction set computers (RISC).

2. Background Art

Complex Instruction Set Computer (CISC) proponents increasingly use very large scale integration to construct highly complex microprocessor hardware to do functions previously done by software alone. This is the result of software becoming increasingly expensive and hardware (VLSI) increasingly cheaper. By using cheaper and more complex hardware, the CISC designer reasons, the higher level language can become simpler and hence easier to use and the software development cost goes down.

RISC proponents, on the other hand, create simpler microprocessors where more functions are done by software. Such machines are based on the insight that the vast majority of functions executed in any given program tend to be rather simple functions such as load, store, compare, branch, integer arithmetic, logic shifting, etc., that can all be designed for execution in one machine cycle. Instead of having microinstructions for interpreting the architecture of the particular CISC for each complex function to be performed, the architectural approach in RISC is to have a reduced instruction set designed for direct execution by hardware. Thus, there is no interpretation required since the microprocessor architecture exactly matches the micro-architecture which, in this case, is just code, i.e., there is no laborious programming involving the setting of ones and zeros in microcode for setting control lines. Everything is done automatically by functions implemented exactly in code.

There can be many aspects to a RISC design approach. An admirable attempt to describe such aspects, drawn from diverse sources, was made in the IEEE, *Computer* magazine of September, 1985, pp. 8-19 by Robert P. Colwell et al in an article entitled "Computers, Complexity, and Controversy." The aspects described included: (1) "Single-cycle operation" for facilitating the rapid execution of simple functions that dominate a computer's instruction stream and promoting a low interpretive overhead; (2) "Load/store design" following from a desire for single-cycle operation; (3) "Hardwired control" providing for the fastest possible single-cycle operation since microcode leads to slower control paths and adds to interpretive overhead; (4) "Relatively few instructions and addressing modes" facilitating a fast, simple interpretation by the control engine; (5) "Fixed instruction format" for easing, with consistant use, the hardwired decoding of instructions, which again speeds control paths; and (6) "More compile-time effort" offering an opportunity to explicitly move static run-time complexity into the compiler.

As pointed out in the above quoted article, a common misconception about RISC and CISC, probably due to their acronyms, is that the domain for discussion should be restricted to selecting candidates for a machine's instruction set. Although the number of instructions is one of the primary issues in the RISC literature, the best generalization of RISC theory goes well beyond this issue. Colwell et al point out that RISC theory connotes a willingness to make design trade-offs freely and consciously across architecture/implementation, hardware/software and compile-time/run-time boundaries in order to maximize performance, as measured in some specific context.

According to this thinking, although the RISC and CISC acronyms seem to imply that any machine can be classified as one or the other, in actuality RISCs and CISCs should be thought of as being at different corners of a continuous multi-dimensional design space. Thus, the need is not for one exclusive of the other but for the formulation of a set of techniques drawn from CISC experiences and RISC tenets, which can be used by a designer in creating new systems.

Notwithstanding the above, it will be understood that the number of instructions is an important criterion for categorizing an architecture as a RISC or CISC. Therefore, the RISC disclosure and claims which follow, which formulate such techniques, should be understood as falling in the category of a design philosophy for a computer with, in fact, a reduced instruction set, without limitation to a RISC having some or all of the attributes of a RISC machine, so well described by Colwell et al. In other words, the disclosure which follows draws on some RISC concepts other than a reduced instruction set and is not necessarily located at the RISC "corner" of the "design space."

The military has defined a standard 16-bit complex instruction set architecture (MIL-STD-1750 and its progeny) for airborne computers. The purpose of the standard is to establish a uniform instruction set architecture for specifying Air Force avionic weapon systems without defining specific implementation details of a computer. Thus, it only defines the complex instruction set architecture and system-unique requirements are left for later definition for each specific computer. Its application is not restricted to any particular avionic function or specific hardware implementation. Generally, the standard may be applicable, without limitation, to computers that perform such functions as moderate accuracy navigation, computed air release points, weapon delivery, air rendezvous, stores management, aircraft guidance, and aircraft management. The description "MIL-STD-1750" may be used throughout this document to describe the original standard and all its progeny, except where specific revisions are described, and it should therefore be understood in that sense.

The expected benefits of the MIL-STD-1750 standard instruction set architecture are the use and re-use of available support software such as compilers and instruction level simulators. Other benefits may also be achieved such as: (a) reduction in total support software gained by the use of the standard instruction set architecture for two or more computers in a weapon system, and (b) software development independent of hardware development.

The military standard defines the functional operation from a programmer's perspective. It defines data formats, instruction formats, instruction mnemonics, instruction operations, addressing modes, programmer accessed registers, interrupt structure, etc. Since it does not define specific implementations, it is vendor and technology independent. As mentioned, its use is expected to promote the use of standard software support tools, the reduction of total support software in multi-vendor military systems and software development independent of hardware development.

The MIL-STD-1750 register set includes sixteen 16-bit general purpose registers (R0, ... RF), a 16-bit status word (SW), a 16-bit instruction counter (IC), a 16-bit mask register (MK), a 16-bit interrupt register (PI), and a 16-bit fault register (FT).

The data formats supported include byte (upper, lower), 16-bit fixed point single precision (16-bit 2's complement), 32-bit fixed point double precision (32-bit 2's complement), 32-bit floating point (24-bit 2's complement mantissa; 8-bit 2's complement exponent), and 48-bit floating point extended precision (48-bit 2's complement mantissa; 8-bit 2's complement exponent).

The MIL-STD-1750 instruction set is a complex instruction set which has been implemented by several companies, so far, using CISCs. For example, Fairchild, MacDonnell-Douglas and Performance Semi-Conductor among others, have all marketed MIL-STD-1750 CISC machines.

DISCLOSURE OF THE INVENTION

An object of the present invention is to provide a simple microprocessor. The microprocessor provided may be viewed as a reduced instruction set computer (RISC), or simply as a signal processor having a simple architecture. The word "RISC" will be used frequently throughout the specification in connection with this object of the present invention.

Another object of the present invention is to provide a reduced instruction set computer (RISC) having single-cycle operation for most instructions.

Still another object of the present invention is to provide a RISC load/store design which follows from the above object of single-cycle operation.

Still another object of the present invention is to provide hardwired control for fast single-cycle operation.

Still another object of the present invention is to provide relatively few instructions and addressing modes to facilitate a fast, simple interpretation by the control engine.

Still another object of the present invention is to provide a fixed instruction format which may be used consistently to ease the hardwired decoding of instructions which in turn speeds control paths.

Still another object of the present invention is to provide a simple RISC architecture useable with numerous possible reduced instruction sets.

Still another object of the present invention is to provide a reduced instruction set which is conducive to the implementation of such a simple RISC architecture.

Still another object of the present invention is to provide a signal processing method using a reduced instruction set for emulating a complex instruction set.

Still another object of the present invention is to provide a reduced instruction set signal processor capable of emulating a MIL-STD-1750 instruction set.

Still another object of the present invention is to provide a MIL-STD-1750 microprocessor with which the user may define functions by writing RISC code subroutines for off-chip storage and callup.

Still another object of the present invention is to provide a reduced instruction set signal processor for use in efficiently emulating a complex instruction set.

Still another object of the present invention is to provide a method of designing a signal processor which responds to complex instructions but executes them using groups of reduced instructions.

Still another object of the present invention is to provide such a method for quickly designing a signal processor in which the architecture of the reduced instruction set signal processor may be designed and reduced to hardware ("silicon") while the programming for the code emulation of the complex instruction set (in reduced instructions) is concurrently carried out. In other words, this object of the present invention is to provide a reduced instruction set signal processor for emulating a complex instruction set which signal processor has a quick design cycle.

According to a first aspect of the present invention, a reduced instruction set computer (RISC) having a Harvard architecture, i.e., having separate data and instruction buses is provided.

According to a second aspect of the present invention, the RISC is designed for use as an emulator of a complex instruction set computer (CISC). The RISC responds to complex instructions received over its operand or data bus by addressing, over the RISC instruction bus, a corresponding one of a plurality of groups of RISC instructions, each corresponding to one of the complex instructions. Once the first instruction of the group corresponding to the received complex instruction is addressed and executed, the remainder of the associated reduced instructions in the particular group may be addressed and executed in sequence until all the instructions in the group have been completely executed. In this way, the complex instructions are emulated in hardware using groups of reduced instructions. The reduced instructions are received over the instruction bus of the RISC machine.

In further accord with this second aspect of the present invention, the reduced instruction set computer having the Harvard architecture is designed for use not only as a reduced instruction set signal processor for emulating a complex instruction set computer, but also as a reduced instruction set signal processor operating in a reduced instruction set operating mode using the instruction bus, as before, for RISC instructions but, in this mode, using the data bus only for operands. This can be characterized as the RISC operating mode. By selecting which mode one wishes to be in, one may select either the RISC or the complex instruction emulation mode and operate as selected.

In still further accord with the second aspect of the present invention, the plurality of groups of reduced instructions are stored in a memory store external to the signal processor. As mentioned above, the instructions within a group are stored sequentially for execution. In other words, the addressing of the first reduced instruction in a group is quickly followed by the sequential execution of each of the other reduced instructions in the group.

In still further accord with the second aspect of the present invention, the complex instruction set emulated is a MIL-STD-1750 instruction set.

According to a third aspect of the present invention, a method of designing a signal processor responsive to complex instruction set instructions comprises the steps of first designing a reduced instruction set signal processor having separate data and instruction buses for use as a reduced instruction set signal processor and, second, designing the reduced instruction set signal processor to emulate the complex instruction set, whereby the data bus of the RISC machine is used for both incoming complex instruction set instructions and bi-directional data relating thereto. The RISC instruction bus is used for addressing and receiving reduced instruction set instructions only. A plurality of reduced instructions are executed for each incoming complex instruction received. In this way, the hardware can be designed and reduced to practice while the emulation code is concurrently being written.

In still further accord with the first aspect of the present invention, a signal processor architecture has an arithmetic logic unit (ALU) responsive to a first input signal and to a second input signal for performing a logical operation upon the two input signals and for providing an ALU output signal indicative of the result of the logical operation. It also has an accumulator which is responsive to the ALU output signal, for storing it and providing it back to a "B" multiplexer (BMUX) which selects from among three different signals, including the accumulator output signal, for providing the second ALU input signal. Another one of the inputs to the BMUX is a RISC instruction counter output signal which constitutes an address of an instruction to be executed or manipulated by the ALU. The third input to the BMUX is the output of a destination register which is responsive to any one of a number of registers in a register file. The destination register output signal may instead be provided as data on the operand bus. The instruction counter may receive starting instruction addresses from the ALU and may be regularly clocked for sequential incrementing of addresses. The ALU output signal may also be provided to the register file which contains a number of registers also responsive to incoming operand signals from the data or operand bus. The register file stores either the ALU output signal or the operand signal in selected storage registers as decoded from the incoming instruction. The register file provides register outputs to the destination register and the source register. The source register stores the signal received from the register file and provides it to an "A" multiplexer (AMUX) or as an output to the operand address bus. The AMUX is also responsive to RISC instructions received from the RISC instruction bus as previously addressed by the RISC instruction counter. The AMUX provides the first input signal to the ALU. A hardwired control unit decodes incoming complex instructions and provides all the necessary control signals for operating the above described architecture in the proper sequences.

The hardwired control unit decodes instruction signals for: (i) addressing sequentially stored instructions by providing an incrementing signal to the RISC instruction counter during a first quarter of each machine cycle; (ii) providing, during a second quarter of selected machine cycles, control signals to a register file for selecting storage registers in the register file to have their signal contents operated on by the ALU and for providing, during the second quarter, the selected register signal contents for storage in the source and destination registers; (iii) providing, during a third quarter of selected machine cycles, enabling signals for enabling the operand address and data buses in response to an instruction to load or store data from memory to the register file or to memory from the register file; (iv) providing, starting during a third quarter of selected machine cycles, a first select signal to the AMUX for selecting between the source output signal and the instruction signal for provision as said first input signal for the ALU; (v) providing, starting during the third quarter of selected machine cycles, a second select signal to the BMUX for selecting between the destination output signal, the accumulator output signal and the instruction address signal for provision as the second input signal for the ALU; (vi) selecting, starting during the second quarter of selected machine cycles, an operation to be performed by the ALU by providing an ALU operation select signal to the ALU; (vii) storing, during a first quarter of selected machine cycles, the ALU output signal in the register file, the accumulator, or the instruction counter by providing an ALU output select signal to the appropriate register; and (viii) providing shift signals, during an extended fourth quarter of selected machine cycles, for performing shift, multiplication and division operations.

In still further accord with the second aspect of the present invention, such a RISC signal processor further comprises a complex instruction set program register responsive to complex instruction signals provided relating to an application program written with complex instructions received over the data bus for storing and providing such complex instruction signals to the control means for decoding and providing a reduced instruction set address signal to the RISC instruction counter for addressing the first instruction signal of a group of sequentially stored reduced instruction set signals. Each such group addressed is one of a plurality of such groups, each designed for emulating one of the complex instructions in the complex instruction set. A complex instruction set program address counter is responsive to an incrementing signal for addressing the next complex instruction in the application program in sequence, or is responsive to an ALU output signal for storing and providing an exception complex instruction address signal.

In still further accord with the second aspect of the present invention, the complex instruction signals received are decoded by the control means and are sequentially addressed by providing the program counter with the incrementing signal during a first quarter of selected machine cycles. The control means also provides the reduced instruction set address signal for beginning a group of such reduced instructions to the RISC instruction address counter during a third quarter of selected machine cycles. It also enables the complex program register during a first quarter of selected machine cycles to receive, store and provide the complex instruction signals.

The first aspect of the present invention provides a simple architecture which may be designed and used simply as a RISC machine, without any reference whatsoever to any emulation of a CISC. Of course, as explained in the Background Art section, such a simple architecture can have RISC attributes and CISC attributes at one and the same time and it is therefore difficult to make a hard and fast boundary between the two. Therefore, it will be understood that the present architecture is located in the design space between the two extremes and is not really strictly characterizable as either except in the broad "reduced instruction" sense, discussed above. The "reduced" instruction set disclosed in the specification is particularly well suited for execution on the disclosed architecture. However, it will be understood that other RISC instruction sets may be formulated for execution on the architecture disclosed.

Nevertheless, the simple architecture provided takes several different RISC architectural approaches which, without limitation, will be described. First, all instructions except the shift, multiply and divide instructions are executed within a single "two-clock" machine cycle. Operands are register-to-register, with only LOAD and STORE accessing memory. This simplifies internal control. All RISC instructions are executed using hardwire control. No microcode is used. Only 32 instruction operations are implemented. Addressing is limited to register indirect and immediate modes. The instruction format is simple and does not cross word boundaries.

In addition to the RISC architecture disclosed herein, a particularly useful design methodology is disclosed, according to the third aspect of the present invention, by which a CISC may be emulated, in the sense that the signal processor is actually responsive to the complex instructions received from the complex instruction set; each such complex instruction received by the RISC machine triggers the addressing of a particular group of reduced instructions preformulated for executing each such instruction by way of emulation. Thus, for each complex instruction emulated, there exists a group of reduced instructions stored for call up and execution in hardware. This design approach permits the RISC architecture to be designed quickly for a hardware embodiment, e.g., as a gate array, while at the same time the emulation code is being developed. Thus, if the designer wishes to design a CISC he may more quickly obtain his objectives by first designing a RISC, proceeding to reduce it to "silicon", while at the same time continuing development of the emulation code for emulating the complex instruction set. It is estimated that this approach costs less than 10% of the cost of designing a CISC as a pure CISC, and with superior results. One of the primary cost savings are related to reduction of the design jeopardy usually experienced by CISC designers in the form of several design cycles.

This design approach provides the advantage of quick turnaround because of the concurrent reduction of the hardware to "silicon" while, at the same time, the emulation code is being written. But speed is not the only advantage. Once a hardware design is reduced to "silicon" the design process is completed with respect thereto and no further changes can be made. Design errors are almost inevitably discovered at this stage, requiring another costly design cycle with the possibility of additional errors being uncovered later even after the second design. This is an extremely costly process both in terms of time and money. The present invention permits the circumventing of this problem by designing an extremely simple architecture in hardware which although also being subject to hardware design "problems" may nonetheless be susceptible to correction using the emulation code to bypass hardware problems. As is known in the art, during the design process, a function may be effected by the designer, in a given signal processor, in usually more than one way. Thus, if one is attempting to emulate a CISC using a RISC machine one may design the RISC and, in the event of a "glitch" in the hardware design which does not permit a complex instruction to be executed in the manner first contemplated in the original design, the designer can change around the emulation code to emulate the "problem" complex instruction in another manner. Thus, the present approach provides the flexibility to tolerate hardware design glitches.

The design methodology for implementation of a complex instruction set computer using RISC, disclosed herein, splits the task of designing a CISC between hardware and software. The design efficiency comes from the efficiency of the software. In the prior art, all functions were on one chip. The present disclosure teaches the use of a "two-chip solution" in which the control function is separated from the implementing function. The simple machine disclosed herein speeds the hardware design process and also permits the concurrent design of emulation code. The design jeopardy experienced in the prior art, i.e., being exposed to several hardware iterations before getting the design to operate properly is avoided.

The second aspect of the present invention provides a RISC machine executing RISC code arranged in groups for emulating a CISC. An embodiment of this aspect may provide the capability of running a RISC machine either as a pure RISC machine with a Harvard architecture in a pure RISC mode, or as a RISC machine executing RISC code arranged in groups for emulating a CISC. In either case, each such group of code may be executed in response to a complex instruction to which it corresponds. Once the initial address of the group is placed on the RISC address bus the other members of the reduced instructions in that group are executed in sequence. The novel approach of having a CISC emulated by means groups of RISC code and the novel approach of having the RISC machine run just as a RISC or as an emulator provide powerful signal processing tools according to a reduced instruction set philosophy, while at the same time providing the capability to emulate a complex instruction set using the reduced instruction set architecture. This aspect of the present invention, when used in this way, is indeed a powerful tool.

The ability of the user to develop his own, user-defined functions to be executed in RISC code is another powerful feature of the reduced instruction set signal processor emulator as taught by the second aspect of the present invention. Ordinarily, a MIL-STD-1750 CISC manufacturer would require its customers to order custom-made, specially developed MIL-STD-1750 microprocessor chips if that customer wishes to implement a user-defined function, as permitted by that military standard. (MIL-STD-1750A implicitly permits user-defined functions while MIL-STD-1750B expressly provides for such functions). The present invention provides the user with the capability of defining any number of such user-defined complex instructions for execution in RISC code after the chip is bought; these may be designed by the customer simply using the RISC instruction set associated with the RISC machine and stored separately in a memory storage device, such as a PROM, for use with the RISC microprocessor. The complete RISC instruction set must of course be explained to the customer in the product literature provided at the time of purchase of the MIL-STD-1750 microprocessor to enable him to write user-defined functions.

In addition to all of the above teachings of the first aspect of the present invention, a specific reduced instruction set is taught along with the specific RISC architecture which is of course, as previously mentioned, particularly useful for implementing that instruction set as well as many other possible similar instruction sets. The specific RISC architecture disclosed is also extremely useful for the purpose of emulating MIL-STD-1750 instructions as per the second aspect, as taught below.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
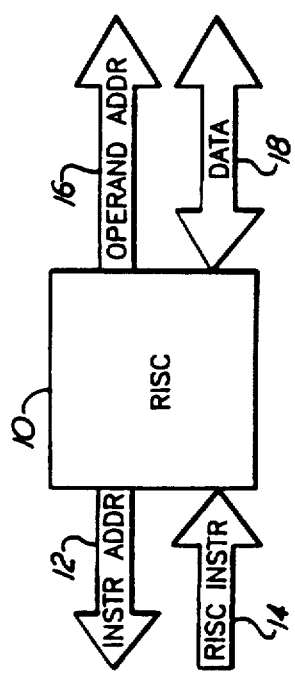
FIG. 1 is an illustration of a RISC 10, according to the first aspect of the present invention.

FIG. 1 is an illustration of a simple signal processor 10, according to the first aspect of the present invention, which may be broadly characterized as a reduced instruction set computer (RISC) and which would normally, without limitation, take the form of a microprocessor. The novel RISC of the present invention has a Harvard architecture, i.e., meaning the instruction and data buses are separate. A RISC instruction address bus 12 is used to address reduced instructions which are then received over a reduced instruction bus 14 by the RISC 10. An operand address bus 16 is used to address data which is either received or provided by the RISC 10 over a data bus 18, which may be bi-directional. As discussed above, in the Background Art section, the acronym "RISC" is used herein in the broadest sense of a reduced instruction set machine.

The use of a Harvard architecture is distinct from a multiplexed instruction/data bus approach as used in the prior CISC art in which such a von Neumann architecture has been the preferred approach. The Harvard architectural approach permits the RISC to operate at a much faster speed due to the fact that instructions and data may be accessed at the same time. This is in keeping with the above discussed general RISC approach of maximizing performance.

Figure 2:
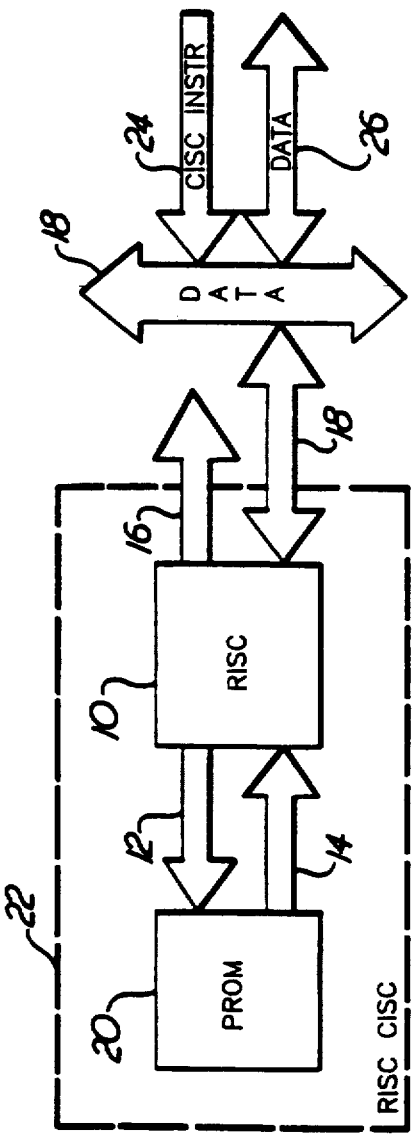
FIG. 2 is an illustration of a RISC 10, according to the first aspect of the present invention, used along with a separate memory store 20 containing groups of RISC instructions, each group for emulating a complex instruction received from a source of complex instructions over the data bus 18, according to the second aspect of the present invention.

FIG. 2 is an illustration of a RISC 10, similar to the RISC 10 of FIG. 1, and having the same Harvard architecture. The RISC 10 of FIG. 2 is associated with a memory storage device 20, such as a programmable read only memory (PROM) which when used together, according to the second aspect of the present invention, may emulate a complex instruction set computer (CISC). The RISC 10 and the PROM 20 may together be thought of as a "two-chip" 22 embodiment of or "solution" to the concept of using a RISC to emulate a CISC. The two-chips 22 are in fact a CISC. This turns out to be a highly effective approach, as disclosed above, from both the designer and user perspectives.

Complex instructions in the form of signals are provided over a signal line 24 to the data bus 18 by which they are transmitted to the RISC 10. The source of the complex instructions 24 is not relevant to the present invention but would generally consist of some application program which is to be executed by the "CISC" 22. Complex instructions are sequentially received in this manner and decoded by the RISC 10. For each such complex instruction received, an initial starting address is provided on the RISC instruction address bus 12 to the PROM 20 where a group of RISC instructions, corresponding to the particular CISC instruction being emulated, are sequentially stored. The first RISC instruction addressed in the PROM 20 is then placed on the RISC instruction bus 14, typically for an entire machine cycle. After the instruction has been safely delivered to the RISC 10 for storage or execution, the RISC 10 will next increment the address on RISC instruction address bus 12 for accessing the next sequentially stored emulation instruction for placement on instruction bus 14. This process continues until the entire group of RISC instructions (stored in PROM 20 for emulating the particular CISC instruction received over data bus 18) has been executed by way of emulation. A given instruction may, among others, involve a memory load/store operation in which the data bus 18 is used to load or store operands by way of data bus 18 and an extension 26 thereof (which merely indicates a path to a data source or destination).

A RISC

Figure 3:
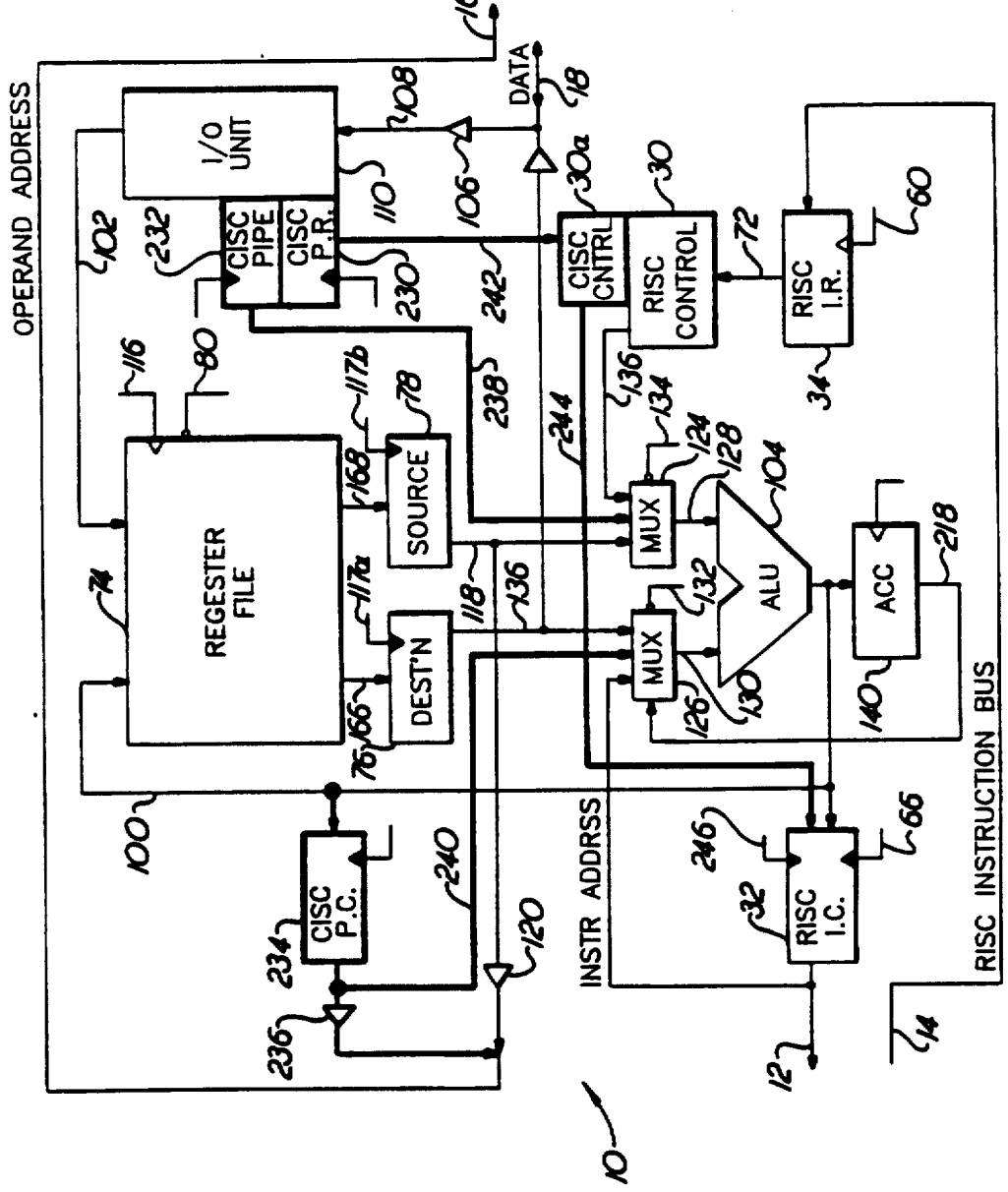
FIG. 3 is a more detailed illustration of a RISC 10, according to the first aspect of the present invention, as illustrated by lightly drawn lines (the heavily drawn lines provide additional hardware necessary for implementing a RISC which may emulate a CISC, according to the second aspect of the present invention)

FIG. 3 is a simplified block diagram illustration of the internals of a RISC 10, similar to the RISCs illustrated in FIGS. 1 and 2. The lightly drawn lines of FIG. 3 correspond to a RISC 10 of FIG. 1, without the CISC emulation aspect of the present invention. FIG. 3 will first be described in terms of these more lightly drawn lines, in order to first fully explain the operation of a RISC embodiment of the first aspect of the present invention. The more heavily drawn lines will then be described in detail in order to fully describe an embodiment of the second aspect of the present invention, i.e., a RISC used to emulate a CISC, as illustrated in FIG. 2.

A control unit 30 provides the internal control signals (not shown for the sake of simplicity) for the RISC 10. Among the functions controlled by such control signals is the fetching of the next RISC instruction to be executed. This is accomplished by incrementing an instruction counter 32, used to hold a RISC instruction address, for loading a RISC instruction stored at that address into an instruction register 34. The instruction register 34 is actually made up of two registers, a "pine" or primary register for initially receiving and storing the RISC instruction currently on the instruction bus 14 (during the current machine cycle) and another, secondary, register for holding the instruction which was on the instruction bus 14 during the previous machine cycle until the middle of the current machine cycle. The pipe transfers its contents to the secondary register in the middle of each machine cycle, as described in more detail below.

Figure 4:
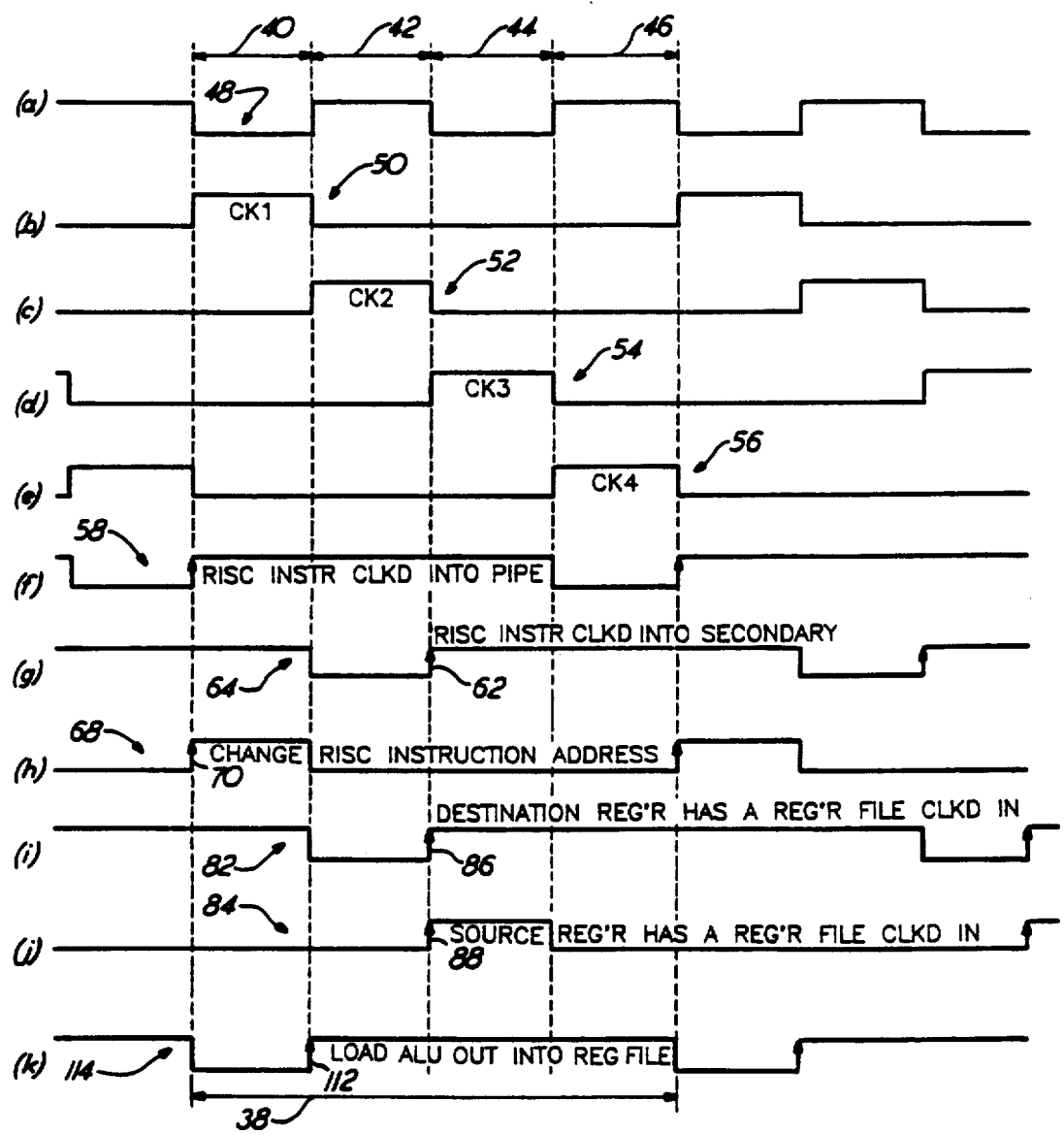
FIG. 4 illustrates various waveforms corresponding to the voltage levels of various signals on lines illustrated in FIG. 3.

Referring now to FIG. 4, an illustration is there shown of the various waveforms corresponding to the various control signals provided by the control unit 30. It will be observed that, for illustrative purposes, the various waveforms of FIG. 4 are "frozen" in time for comparison with each other within a single machine cycle 38, which is split up into quarter machine cycles 40, 42, 44, 46. A basic system "clock" waveform 48 is shown in FIG. 4(a), which may be of any selected frequency or duty cycle. FIG. 4(b) shows a first quarter 40 clock signal waveform 50 (CK1) which is useful for various purposes to be described in more detail below. FIG. 4(c) shows a waveform 52 (CK2) which recurs (in this case, high) during the second quarter 42 of each machine cycle. FIG. 4(d) shows a waveform 54 (CK3) recurring during the third quarter 44 of each machine cycle. FIG. 4(e) shows a waveform 56 (CK4) recurring during the fourth quarter 46 of each machine cycle.

FIG. 4(f) illustrates a waveform 58 which shows the timing of the loading of the "pipe" register in the instruction register 34. Waveform 58 is shown with a small arrow at the rising edge of a change in voltage from low to high occurring at the same time as the rising edge of CK1 of waveform 50 of FIG. 4(b). This indicates that the instruction present on RISC instruction lines 14 of FIG. 3 (which will have been present, at that point in time, for a full machine cycle) is now settled out and ready for clocking into the RISC instruction register pipe within the instruction register 34. Thus, a clock line 60, shown in FIG. 3, rises on the rising edge of CK1 at the beginning of each machine cycle. In other words, the contents of the instruction register pipe is chanced at the beginning of each machine cycle. After the instruction has been present in the "pipe" register for two full quarter cycles it is latched from the "pipe" into the secondary instruction register, i.e., at the beginning of CK3 as shown by a rising edge 62 of a waveform 64 in FIG. 4(g). Of course, it will be understood that the signal presented to the input of the secondary register during the second quarter 42 is present at the output of the secondary also during this second quarter 42, since the clock is low. Therefore, the opcode can begin to be decoded by the control during this second quarter period even though not yet latched. Thus, although the instruction in the "pipe" is resident therein from the beginning of a machine cycle to its end, the contents of the pipe are also copied into the secondary instruction register in the middle of each machine cycle. Therefore, the time that a given instruction is present in the secondary register overlaps from the middle of one machine cycle to the middle of another.

At the same time that the instruction on the instruction bus 14 is clocked into the instruction register 34 "pipe," the address on the instruction address bus 12 is normally incremented to the next sequential address as initiated by a control signal whose timing is shown in FIG. 4(h), waveform 68, having its operative clocking (rising edge 70) timing coincident with the rising edge of CK1 at the beginning of each machine cycle. If, however, an exception instruction is to be executed, it will be loaded with an out of sequence address.

Another function of the control unit 30 is to decode, in different ways, the instructions residing in the instruction register 34 "pipe" and in the secondary register of the instruction register 34. During the first quarter 40 of each machine cycle, the control unit 30 decodes the register field portion of the instruction just loaded into the pipe register of the instruction register 34. A line 72 indicates the transfer of information from the pipe to the control unit 30 for decoding of the register fields. (The RISC instruction format will be described in detail below. Suffice it to say at this point that for the embodiment shown, for a 16-bit RISC register-to-register instruction format, the six most significant bits are the opcode, the next five most significant bits are the destination field and the last five bits are the source field). The decoded register field information may be used, while in the pipe, to identify a selected pair of registers in a register file 74 which are to be loaded into a destination register 76 and source register 78. Once the register fields are decoded, the proper pair of registers is selected, as indicated by a select line 80 which is activated during the second quarter 42 of the machine cycle. FIGS. 4(i) and 4(j) illustrate waveforms 82, 84, respectively, which indicate by their respective rising edges 86, 88, that the selected registers in the register file 74 are clocked into the destination and source registers 76, 78 at that time, i.e., at the mid-point of the machine cycle.

At this point in time, as discussed above, the instruction in the pipe is latched into the secondary register in the instruction register 34. While in the secondary register of the instruction register the opcode is decoded for the purpose of determining the operation to be performed. The destination field is also decoded again at this time for the purpose of determining the register or registers within the register file 74 which is or are to be written into with either the results of an internal operation or with an operand moved in from the data bus 18. These two alternative loading paths are indicated by a signal line 100 and a signal line 102. The signal line 100 represents the 32-bit output of an arithmetic-logic unit (ALU) 104 which operates on, among others, signals provided by the destination and source registers 76, 78. For an operation in which the contents of destination and source registers 76, 78 are operated on by the ALU 104, the output of that operation is provided on line 100 back into a register pair from which the destination register 76 was originally loaded. On the other hand, the information might instead be from the data bus 18 via a buffer 106, a signal line 108, an input/output (I/0) unit 110 and signal line 102. The I/0 unit may be thought of, for the purposes described thus far, as simply a short circuit from signal line 108 to signal line 102, i.e., it serves no function relevant to the present level of disclosure. (It will, however, be important with respect to a subsequent level of disclosure in connection with a MIL-STD-1750 embodiment of the present invention and is therefore included in FIG. 3 for that purpose).

If the control 30 selects an operation for the ALU 104 which involves an ALU output signal on the line 100 into a register or register pair in the register file 74, as decoded from the secondary register in the instruction register 34, the output of the ALU is clocked into the selected register or register pair in the register file 74 at the beginning of the second quarter of the machine cycle as indicated by a rising edge 112 of a waveform 114 in FIG. 4(k). This waveform represents the voltage present on a clock line 116 shown in FIG. 3 for clocking the register which is to be written into by the ALU 104.

Thus, during the first half of each machine cycle, the control unit 30 decodes the instruction register 34 pipe to determine a pair of registers in the register file to be accessed for loading the destination and source registers 76, 78 and decodes the secondary register in the instruction register 34 for the purpose of determining which register in the register file 74 is to be loaded with the input bus 102 or with output of the ALU from the previous machine cycle. The ALU output signal on line 100 or data on line 102 is loaded in the selected register or register pair on the rising edge of CK2 while the destination and source registers are loaded on the rising edge of CK3.

If the opcode decoded from the instruction in the secondary register in the instruction register 34 turns out to be a load/store instruction for loading or storing data from or to an external memory space, then there will have to be an operand address output from the source register 78 onto the operand address bus 16 via a signal line 118 and a buffer 120. The control 30 will of course enable the buffer 120 for the purpose of passing the signal on line 118 over to the operand address bus 16. This will occur on the rising edge of CK3 as clocked on signal lines 117a and 117b. On a load operation, an operand will then appear on the data bus 18 from the memory which will be routed into the register file 74 via buffer 106, as enabled by the control 30, line 108, I/O 110, and signal line 102. The destination field of the RISC instruction residing in the secondary register in the instruction register 34 is used, as it was for an instruction relating to an ALU operation, for designation the register within the register file 74 into which the operand is to be loaded. Again, this occurs on the rising edge of CK2 as shown in waveform 114 of FIG. 4(k). On a store operation, an operand will be provided on the data bus 18 from the register pointed to by the destination field of the instruction which is loaded into the destination register 76.

Thusfar, the control unit 30 has been described performing its functions of fetching RISC instructions by incrementing the instruction counter 32, decoding current instructions received in both the primary ("pipe") register and secondary register of an instruction register 34 for performing various control functions internally within the RISC machine 10, including selecting registers to be operated on within the register file 74 and storing them into source and destination registers 76, 78, and loading either an ALU output signal from the previous instruction into a selected register in the register file 74 or loading an operand from the data bus 18 if the decoded operand indicates a load operation from memory.

The next control function to be described is the selection of inputs to the ALU 104 through a pair of multiplexers 124, 126. The first multiplexer 124 provides a first input signal 128 to a first input of the ALU 104. The second multiplexer 126 provides a second input signal on a line 130 to a second input of the ALU 104. These input signals are selected by means of select lines 132, 134 from among several different input signals to each multiplexer. The select lines are provided by decoding the secondary instruction register and are present by the time of occurrence of the rising edge of CK3. In other words, when the destination and source registers 76, 78 have been loaded with the selected registers then the multiplexers will be selected. If the destination and source registers 76, 78 are selected for having their contents operated on by the ALU 104 then their contents will be transferred via lines 118 and 136 and through the respective multiplexers 124, 126 into the proper inputs of the ALU for having the proper operation executed. The control unit 30 also selects the operation to be performed by the ALU by decoding the opcode while it resides in the secondary instruction register. This would normally occur sometime after the rising edge of CK3. The ALU is capable of the standard repertoire of operations including ADD, AND, OR, and EXCLUSIVE OR. Once the output of the multiplexers have stabilized the operation is then stabilized in hardware to provide a stable output on the line 100.

For the RISC 10 illustrated in FIG. 3, at the present level of disclosure, i.e., in connection with the first aspect of the present invention, each of the multiplexers 124, 126 is responsive to only two separate signals. Additional signals will be described later in connection with another level of disclosure for describing the second aspect of the present invention. The other inputs to the multiplexers, for the RISC level of disclosure, are connected with the RISC instruction and instruction address buses. Thus, multiplexer 124 is responsive to an instruction signal on a line 136 from the control unit 30. This would correspond to an immediate data field residing in the secondary register of the instruction register 34 which would be transferred into the multiplexer 124 during the third quarter 44 of the particular machine cycle in which it was desired to perform an operation on a RISC instruction. These would be few and far between, however, as compared to for example, the normal internal operations in which data is manipulated rather than an immediate data field (in the instruction). Register-to-Immediate instructions will be described below, in connection with the description of the RISC instruction set. The multiplexer 126 is also responsive, at this level of disclosure, to a RISC instruction address signal from the instruction address bus 12. Such addresses may also be manipulated from time to time. Thus, the control unit 30 selects inputs to the ALU through the multiplexers 124, 126 for operation therein, according to the opcode. It also selects, according to the opcode, the particular operation to be performed on the input signals by the ALU. The operation is performed by hardwired logic which produces a stable output signal on the line 100 after the inputs become stable. This normally takes place during the latter half of the machine cycle and on into the first quarter of the next machine cycle. The output of the ALU is not loaded into the intended destination until the rising edge of the second quarter of the next machine cycle, i.e., corresponding to rising edge 112 of waveform 114 in FIG. 4(k). The destinations for the ALU output signal on line 100 may be a register in the register file 74, the instruction counter 32 or an accumulator 140. The accumulator is for the purpose of performing shift, multiply and divide operations and is also loaded with the output of the ALU on the rising edge of CK2 during selected machine cycles, as is done with the loading of register files with ALU output signals following the ALU operation.

The control unit 30 also updates system status and checks for exception program flow (interrupts, calls, jumps). Appropriate control signals are provided to the various functional entities shown in FIG. 3 in such cases.

Figure 5:
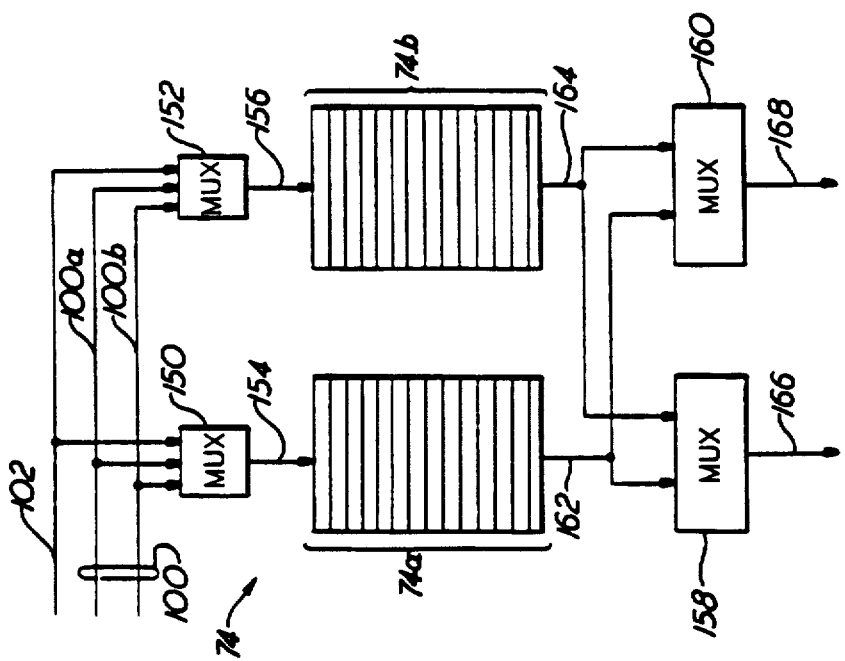
FIG. 5 is a more detailed illustration of the register file 74 of FIG. 3.

Referring now to FIG. 5, a more detailed illustration of the register file 74 of FIG. 3 is there shown. The internal data bus 102 is shown provided to a first 3:1 multiplexer 150 and to a second 3:1 multiplexer 152 which selects between the internal data bus 102 and the ALU output signal on the line 100, which is split in FIG. 5, between a most significant half of the ALU output on a signal line 100a and the least significant half of the ALU output on a signal line 100b. Each of these lines 100a, 100b are also presented to both the first and second multiplexers 150, 152. The control unit 30 of FIG. 3 controls which multiplexer 150, 152 and which path 100, 102 feeds the registers.

The register file 74 itself comprises a group of 20 general purpose registers. The register file can be loaded with either ALU data from the signal line 100 or operand data from the signal line 102 (originating on the data bus 18). RISC instructions perform operations on these registers. FIG. 5 shows the registers split into two groups, a first ("even") group 74a ($R_0-R_{14}$ & A0 & A2), is responsive to an output signal on a line 154 from the first multiplexer 150 and comprises 10 general purpose registers. A second ("odd") group ($R_1-R_{15}$ & A1 & A3) of general purpose registers 74b is responsive to a second signal on a line 156 from the second multiplexer 152. Any of the registers in either group 74a, 74b may provide its contents to a third multiplexer 158 or a fourth multiplexer 160 over signal lines 162, 164. The third multiplexer is a 20:1 multiplexer for providing an output signal 166 to the destination register 76 of FIG. 3. The fourth multiplexer 160 is also a 20:1 multiplexer and provides an output signal on a line 168 to the source register 78 of FIG. 3.

In the embodiment of FIG. 3, the ALU is a 32-bit ALU while the data and data address buses 18, 16, as well as the instruction and instruction address buses 14, 12, are only 16-bit. Therefore, for the structure of FIG. 5, the internal data bus 102 is 16-bit, the most significant half of the ALU signal output line 100a is also 16-bits, as is the least significant half signal on line 100b. The multiplexer output lines 154, 156 are therefore also 16-bit as are all the general purpose registers 74a, 74b. Each of the 20:1 multiplexers 158, 160 constructs a 32-bit word, the most significant half taken from one of the ten registers in the group 74b and the least significant half taken from any one of the registers in either group 74a or 74b. Thus, the destination and source output signals 166, 168 are 32-bit words.

Figure 6:
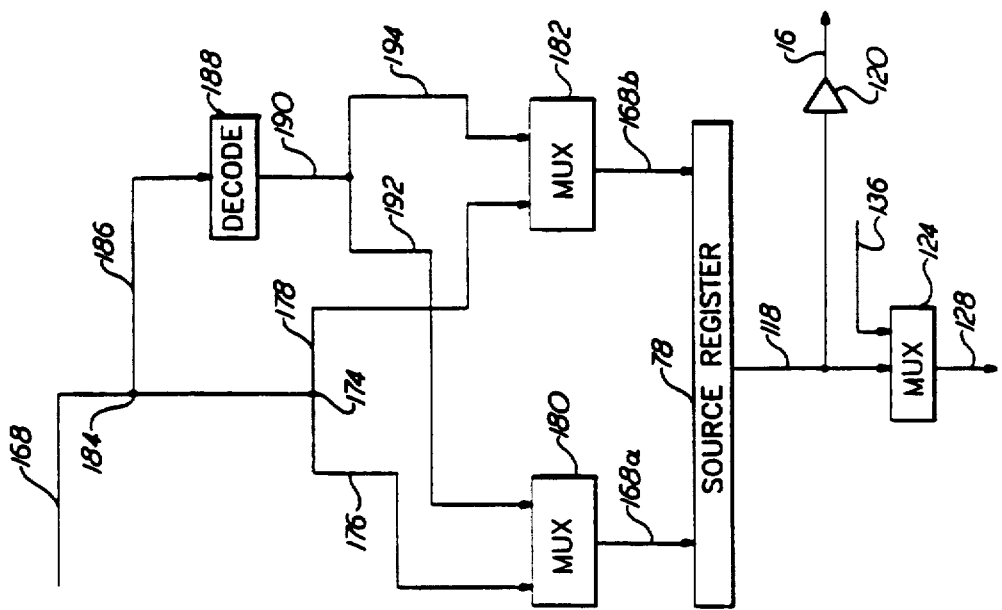
FIG. 6 is a more detailed illustration of the source module 78 of FIG. 3.

Referring now to FIG. 6, an illustration of a source module such as the source module 78 shown in FIG. 3 is there illustrated. The signal on line 168 is a 32-bit signal and it is split into two 16-bit words at a point 174 for presentation as an upper 16-bits on a line 176 and a lower significant half on a line 178 to, respectively, a first 3:1 multiplexer 180 and a second 3:1 multiplexer 182. At a point 184 the least significant 5-bits of the 32-bit word on line 168 is provided on a line 186 to a BIT decoder which selects the appropriate bit for all bit operations (where a bit is changed). A 32-bit word from the BIT decoder 188 is split into a most significant half on a line 192 and a least significant half on a line 194 for presentation to the first and second multiplexers 180, 182, respectively. The first multiplexer selects the most significant half output of a register file or selects a BIT field on a BIT instruction. It also sign extends bit 16 output of the register file (forces to all ones or zeros). The second multiplexer 182 selects the least significant half output of the register file or selects the BIT field on BIT instructions. It also swaps the lower 8-bits and upper 8-bits on BYTE SWAP instruction.

The selected most significant half on a line 168a and the selected least significant half on a line 168b is provided to the source register 78 which, as described before in connection with FIG. 3, is a temporary register used to hold the derived source data field, prior to performing an ALU operation thereon. The source is also used to provide an operand address prior to loading or storing a register to or from memory. This is illustrated in FIG. 3 in which the output line 118 is provided to a buffer 120 which in turn provides the operand address signal on a line 16 to the operand memory space. As mentioned, the output signal 118, if not performing an operand addressing function, is provided to a multiplexer 124 along with an instruction line 136 for providing a first input signal 128 to the ALU 104, as better shown in FIG. 3.

Figure 7:
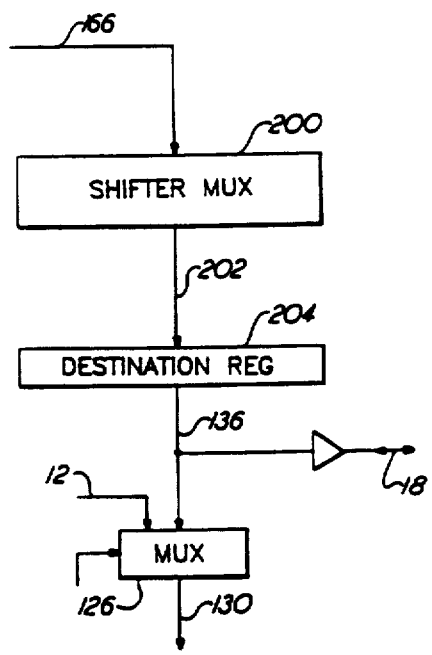
FIG. 7 is a more detailed illustration of the destination module 76 of FIG. 3.

Referring now to FIG. 7, an illustration is there provided of a destination module, similar to the destination module 76 illustrated in FIG. 3. The output signal on the line 166 from the multiplexer 158 in the register file 74 is provided to a 32-bit shifter multiplexer 200 which allows right shift, left shift or no shift on each clock signal on 16 and 32-bit words. It shifts logically, arithmetically, and cyclically. The output of the shifter mux 200 is provided on a line 202 to a destination register 204. This register may be thought of as a temporary register used to hold the derived destination data field output of shifter multiplexer 200. The output of the destination register 204 is provided on the line 136 to the multiplexer 126 for providing the second input signal on the line 130 to the ALU 104 of FIG. 3. The destination module 76 is also used to provide operand data prior to storing a register to memory. The destination can also be shifted right or left 1-bit per clock and is used to perform shift, multiply and divide operations.

Figure 8:
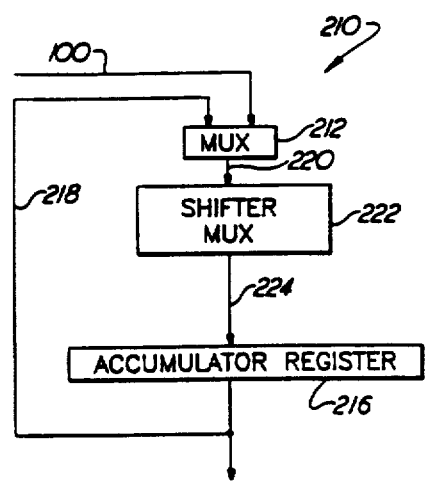
FIG. 8 is a more detailed illustration of the accumulator module 140 of FIG. 3.

Referring now to FIG. 8, an illustration is there provided of an accumulator module 210 similar to the accumulator 140 shown in FIG. 3. The ALU output signal on the line 100 is provided to a 2:1 multiplexer 212 which is also responsive to an accumulator register 216 output signal on a line 218. The multiplexer provides a 32-bit output signal on a line 220 to a shifter multiplexer 222 which permits right shift, left shift or no shift operations as required for multiplication, division, and 64-bit shifts (it is concatenated with the destination register). The output of the shifter multiplexer 222 is provided on a line 224 to the accumulator register 216. The accumulator module 210 as a whole may also be used for temporary storage of data. It should be noted that the results of multiplication and division are formulated in the destination module 76 and the accumulator module 140 or 210.

The signal processor of FIG. 3 has two basic instruction formats that support 16 and 32-bit instructions. The operation code (opcode) consists of the six most significant bits of the instruction. Table I shows the opcode matrix of thirty-two instructions. The opcode's upper 2-bits and next lower 3-bits select, respectively, the column and row for which an instruction is located. The two instruction formats are (1) register-to-register (RR); and (2) register-to-immediate (RI). The least significant bit of the 6-bit opcode selects the format by which the instruction is to be interpreted. Each of the 32 instructions may be executed in each format, depending on the sixth bit.

TABLE I

|     | 00   | 01   | 10   | 11   |
|-----|------|------|------|------|
| 000 | MOV  | ADD  | AND  | SLL  |
| 001 | LR   | ADDC | OR   | SAR  |
| 010 | STR  | AB   | XOR  | SCR  |
| 011 | CALL | ADDU | NOT  | MULS |
| 100 | MOVC | SUB  | RBR  | MOVB |
| 101 | INR  | SUBB | SBR  | SWAB |
| 110 | OTR  | SB   | TBR  | DIV  |
| 111 | JCR  | CMP  | LRI  | STRI |

The register-to-register format is a 16-bit instruction consisting of a 6-bit opcode and two 5-bit register fields. The register field can select any one of: (1) 20 general registers, (2) ten general register pairs, or (3) one accumulator.

```
| Opcode  | Destination |  Source |
  MSB                              LSB
| 0XX XXX |     RD      |    RS   |
 15     10 9           5 4        0
```

The register-to-register destination (RD) and source (RS) field can be selected according to Table II.

TABLE II

| Destination and Source Field selection |||||| 
|---|---|---|---|---|---|
| Bit field value | When RD will select | When RS will select | Bit field value | When RD will select | When RS will select |
| 00000 | R0 | R0 | 10000 | XR0 | XR0 |
| 00001 | R1 | R1 | 10001 | XR2 | XR2 |
| 00010 | R2 | R2 | 10010 | XR4 | XR4 |
| 00011 | R3 | R3 | 10011 | XR6 | XR6 |
| 00100 | R4 | R4 | 10100 | XR8 | XR8 |
| 00101 | R5 | R5 | 10101 | XRA | XRA |
| 00110 | R6 | R6 | 10110 | XRC | XRC |
| 00111 | R7 | R7 | 10111 | XRE | XRE |
| 01000 | R8 | R8 | 11000 | A0 | A0 |
| 01001 | R9 | R9 | 11001 | A1 | A1 |
| 01010 | RA | RA | 11010 | A2 | A2 |
| 01011 | RB | RB | 11011 | A3 | A3 |
| 01100 | RC | RC | 11100 | XA0 | XA0 |
| 01101 | RD | RD | 11101 | XA2 | XA2 |
| 01110 | RE | RE | 11110 | — | *IMM |

TABLE II-continued

| Destination and Source Field selection |||||| 
|---|---|---|---|---|---|
| Bit field value | When RD will select | When RS will select | Bit field value | When RD will select | When RS will select |
| 01111 | RF | RF | 11111 | ACC | ACC |

"*" uses 16-bit extention field for source.

Table II is an illustration of the organization selected for the two halves of the register file 74 of FIG. 5.

TABLE III

| 16-bits | 16-bits | Register Pair |
|---------|---------|---------------|
| R0 | R1 | XR0 |
| R2 | R3 | XR2 |
| R4 | R5 | XR4 |
| R6 | R7 | XR6 |
| R8 | R9 | XR8 |
| RA | RB | XRA |
| RC | RD | XRC |
| RE | RF | XRE |
| A0 | A1 | XA0 |
| A2 | A3 | XA2 |
| ACC |  |  |

The left-hand (16-Bits) column of the table corresponds to the ten registers 74a and the right-hand (16-Bits) column of the table corresponds to the ten registers 74b. As mentioned previously, the registers can be selected for operation in pairs in order to form 32-bit words. The nomenclature for the register pairs shown in Table III and are also reflected in Table II for selection by the register field in the register-to-register instruction. The A0–A3 registers are generally used for holding intermediate results.

The Register Immediate format is a 32-bit instruction consisting of a 6-bit opcode, one 5-bit register address, a 5-bit code indicating an immediate instruction and a 16-bit data field.

```
| Opcode  | Dest |  Src  | Data field      |
  MSB                                      LSB
| 0XX XXX |  RD  | 11110 | 16-Bit Immediate|
 31     26 25  21 20   16 15              0
```

The register/accumulator-to-immediate format encompasses all the instructions of the opcode matrix. The register/accumulator field can be selected as the RD field described in Table II.

THE RISC INSTRUCTION SET

| ADDR MODE | MNEMONIC | REGISTER TRANSFER DESCRIPTION | CPZNV | REGISTERS AFFECTED |
|-----------|----------|-------------------------------|-------|--------------------|
| RR | MOV RD,RS | RD ← RS | ***** | RD |
| RR | LR RD,RS | IF (RS = SP) THEN RS ← RS + 1; RD ← @(RS); IF (RS != SP) THEN RS ← @(RS); | ***** | RD,SP |
| RR | STR RD,RS | IF (RS = SP) THEN RS ← RS − 1; RS ← @(RD); IF (RS != SP) | ***** | RS,SP |

-continued
THE RISC INSTRUCTION SET

| ADDR MODE | MNEMONIC | REGISTER TRANSFER DESCRIPTION | CPZNV | REGISTERS AFFECTED |
|---|---|---|---|---|
| RR | CALL RD,RS | THEN RS ← @(RD); RD ← PC + 2 PC ← RS | ***** | PC, SP |
| RR | MOVC RD,RS | RD ← RS | 0PZN0 | RD, SW |
| RR | INR RD,RS | RD ← @(RS); | ***** | RD, SP |
| RR | OTR RD,RS | @(RS) ← RD; | ***** | SP |
| RR | JCR N,RS | IF (SW = N) THEN PC ← PC + RS; ELSE PC ← PC + 1; | ***** | PC |
| RR | ADD RD, RS | RD ← RD + RS; | CPZNV | RD, SW |
| RR | ADDC RD,RS | RD ← RD + RS + C; | CPZNV | RD, SW |
| RR | AB RD,RS | $RD_{7-0}$ ← $RD_{7-0}$ + $RS_{7-0}$; | CPZNV | RD, SW |
| RR | ADDU RD,RS | RD ← RD + RS; | CPZN* | RD, SW |
| RR | SUB RD,RS | RD ← RD + RS + 1; | CPZNV | RD, SW |
| RR | SUBB RD,RS | RD ← RD + RS + C; | CPZNV | RD, SW |
| RR | SB RD,RS | $RD_{7-0}$ ← $RD_{7-0}$ + $RS_{7-0}$ + 1; | CPZNV | RD, SW |
| RR | CMP RD, RS | RD:RS; | 0PZN* | SW |
| RR | XOR RD,RS | RD ← RD ⊕ RS; | 0PZN* | RD, SW |
| RR | NOT RD,RS | RD ← RS; | 0PZN* | RD, SW |
| RR | RBR RD,RS | RD ← RD AND BIT(RS); | ***** | RD |
| RR | SBR RD,RS | RD ← RD AND BIT(RS); | ***** | RD |
| RR | TBR RD,RS | ALU ← RD AND BIT(RS); | 0PZN* | SW |
| RR | LRI RD,RS | RD ← (RS); | ***** | RD |
| RR | SLR RD,RS | RD ← RD SHIFT (RS); | 0PZN* | RD, SW |
| RR | SAR RD,RS | RD ← RD SHIFT (RS); | 0PZN* | RD, SW |
| RR | SCR RD,RS | RD ← RD SHIFT (RS); | 0PZN* | RD, SW |
| RR | MULS RD,RS | RD ← RD * RS; | ****V | RD, SW |
| RR | MOVB RD,RS | $RD_{7-0}$ ← $RS_{7-0}$; | ***** | RD |
| RR | SWAB RD,RS | $RD_{15-8}$ ← $RS_{7-0}$; $RD_{7-0}$ ← $RS_{15-8}$; | ***** | RD |
| RR | DIV RD,RS | RD ← RD / RS; | ****V | RD |
| RR | STRI RD,RS | @(RS) ← (RD); | ***** | none |

DETAILED DESCRIPTION OF INSTRUCTION SET

Each of the RISC instructions described below is described for the register-to-register format.

However, it will be understood that each has a register-to-immediate format counterpart which may be designated by the status of the sixth, or least significant bit of the opcode.

The Move instruction (MOV) allows the contents of the source register (RS) to be moved to the destination register (RD).

The Load Register instruction (LR) moves the contents of the memory location pointed to by RS to RD. If RS is the Stack Pointer (SP), then the SP is incremented prior to the load.

The Store Register instruction (STR) stores the contents of RD into the memory location pointed to by RS. If RS is the stack pointer, then the SP is decremented.

The Call instruction (CALL) loads the contents of program counter plus two into the register pointed to by RD. The contents of RS are then moved into the program counter.

The Move and Set Status instruction (MOVC) moves the contents of RS to RD.

The Input Register instruction (INR) specifies an I/O cycle which moves the contents of the I/O location pointed to by RS to RD. On the other hand, if the register-to-immediate instruction format is specified for this instruction then an internal cycle is indicated whereby an internal I/O location is moved to RD. A summary of these internal locations is provided in Table IV below.

It will be understood that although the present section of the specification is devoted to the description of a RISC, it is sometimes difficult, descriptively, to entirely separate the RISC, or first aspect of the present invention, from the RISC CISC, or second aspect of the present invention, where the embodiment combines both. Many of the functions disclosed in Table IV are dictated by MIL-STD-1750 and are therefore not strictly related to the first aspect of the present invention. However, they are disclosed at this point in the specification for the sake of cohesiveness. They should be understood, however, with that object in mind.

TABLE IV

| Command field (RS) (hex) | Mnemonic | Command |
|---|---|---|
| 10 | — | Reserved |
| 11 | EA0 | Effective Address Zero |
| 12 | EA1 | Effective Address One |
| 13 | EA2 | Effective Address Two |
| 14 | PI | Pending Interrupt |
| 15 | MK | Mask Register |
| 16 | FT | Fault Register |
| 17 | SW | Status Word |
| 18 | IRS | Instruction Register Source field |
| 19 | IRD | Instruction Register |
| 1A | — | Reserved |
| 1B | — | Reserved |
| 1C | PC | Program Counter |
| 1D | PIPE | Pipe Register |
| 1E | PCREL | PC Relative |
| 1F | — | Reserved |

10. Reserved.

11. Effective address zero (EA0): Used for implementing MIL-STD-1750 addressing modes not implemented by the RISC architecture, i.e., Direct and Direct Indexed (D, DX) addressing modes. The register pointed to by the 1750 Instruction Register Destination field (IRD) is added to the pipe register. The result is stored in selected accumulator (A). The 1750 Pipe register is then loaded with the contents of the memory location pointed to by the 1750 Program Counter. The Program Counter is post-incremented.

12. Effective address one (EA1): Used for implementing MIL-STD-1750 addressing modes not implemented by the RISC architecture, i.e., for Base Relative (B) addressing mode. The register pointed to by the 1750 Instruction Register Base field (IRB) is added to the lower 8-bit of the Instruction register (IR). The result is stored in A.

13. EFfective address two (EA2): Used for implementing 1750 addressing modes not implemented by the RISC architecture, i.e., Based Indexed (BX) addressing mode. The register pointed to by the 1750 Instruction Register Base field (IRB) is added to the register pointed to by the IRD field. The result is stored in A.

14. Read Pending Interrupt (PI): Dictated by MIL-STD-1750 but is used in either RISC or CISC emulation mode. The contents of the pending interrupt register (PI) are stored in A.

15. Read Mask Register (MK): Dictated by MIL-STD-1750 but is used in either RISC or CISC emulation mode. The contents of the Interrupt Mask register (MK) are stored in A.

16. Read Fault Register (FT): Dictated by MIL-STD-1750 but is used in either RISC or CISC emulation mode. The contents of the Fault register (FT) are stored in A.

17. Read Status Word (SW): Used only for 1750 mode. The contents of the 1750 Status Word register (SW) are stored in A.

18. Read Instruction Register Source field (IRS) IRS: The 4-bit IRS field of the 1750 program register 230 is stored in A.

19. Read IRD field (IRD): The 4-bit IRD field in the 1750 PR 230 is stored in A.

1A. Reserved.

1B. Reserved.

1C. Read Program Counter (PC): The contents of the 1750 Program counter 234 are stored in A.

1D. Read 1750 Instruction Pipe register (PIPE): The contents of the 1750 Instruction Pipe register 232 are stored in A. The 1750 Pipe register is then loaded with the contents of the memory location pointed to by the 1750 Program Counter. The Program Counter is post-incremented.

1E. Read Program Counter Relative (PCREL): Takes the 8-bit field in the 1750 instruction register 230 and adds it to the 1750 PC 234. The result is stored in A.

1F. Reserved.

The Output Register instruction (OTR) stores the contents of RD into the I/O location pointed to by RS. This also corresponds to an I/O cycle. However, if the register-to-immediate instruction format is indicated for this instruction then an internal cycle is indicated whereby an internal I/O location is moved to RD. A summary of these internal I/O locations is provided in Table V below:

TABLE IV

| Command field (RS) (hex) | Mnemonic | Command |
| --- | --- | --- |
| 10 | CLFT | Clear Fault Register |
| 11 | PCL | Program Counter Load |
| 12 | ENBL | Enable Interrupts |
| 13 | DSBL | Disable Interrupts |
| 14 | SPI | Set Pending Interrupt |
| 15 | SMK | Set Mask Register |
| 16 | SFT | Set Fault Register |
| 17 | SSW | Set Status Word |
| 18 | IRS | Instruction Register Source field |
| 19 | IRD | Instruction Register Destination field |
| 1A | INCS | Increment IRS field |
| 1B | INCD | Increment IRD field |
| 1C | IRL | Load Instruction Register |
| 1D | IRLD | Load Instruction Register Rest. field |
| 1E | CCOFF | Disable Condition Codes |
| 1F | RPI | Reset Pending Interrupt |

10. Clear Fault Register (CLFT): Can use in either RISC or 1750 emulation mode. The contents of the 16-bit fault register are reset to zero.

11. Load Program Counter (PCL): The 1750 Program counter 234 is loaded with contents of A.

12. Enable Interrupts (ENBL): Dictated by MIL-STD-1750 but is used in either RISC or CISC emulation mode. This command enables all interrupts which are not masked out.

13. Disable Interrupts (DSBL): Dictated by 25 MIL-STD-1750 but is used in either RISC or CISC emulation mode. This command disables all interrupts (except those defined such that they cannot be disabled) at the beginning of the execution of the DSBL instruction. Currently, INT 0—Power Down, INT 1—Machine Error, and INT 5—Executive Call are the only three interrupts that cannot be disabled.

14. Set Pending Interrupt Register (SPI): Dictated by MIL-STD-1750 but is used in either RISC or CISC emulation mode. This command outputs the 16-bit contents of A to the pending interrupt register. If there is a one in the corresponding bit position of the interrupt mask, (same bit set in both the PI and MK), and the interrupts are enabled, then an interrupt shall occur after the execution of the next instruction.

15. Set Interrupt Mask Register (SMK): Dictated by MIL-STD-1750 but is used in either RISC or CISC emulation mode. This command transfers the contents of A to the interrupt mask register. A "1" in the corresponding bit position allows the interrupt to occur and a "0" prevents the interrupt from occurring except for those interrupts that are defined such that they cannot be masked. Currently, INT 0—Power Down, and INT 5—Executive Call are the only interrupts that cannot be masked.

16. Set Fault Register (SFT): Dictated by MIL-STD-1750 but is used in either RISC or CISC emulation mode. The contents of the Fault register (FT) are loaded with the contents of A. A bit value of "1" shall set the particular fault. Refer to Section 4 for Fault register requirements.

17. Set Status Word (SSW): The 1750 Status Word (SW) is loaded with the contents of A.

18. Load IRS (Instruction Register Source Field) field (IRS): The 4-bit 1750 Instruction Register 230 IRS field is loaded with bits 5–8 of A.

19. Load IRD (Instruction Register Destination Field) field (IRD): The 4-bit IRD field in the 1750 PR 230 is loaded with bits 1–4 (bit 1 is LSB) of A.

1A. Increment IRS field (INCS): The 4-bit IRS field in the 1750 PR 230 is incremented.

1B. Increment IRD field (INCD): The 4-bit IRD field in the 1750 PR 230 is incremented.

1C. Load Instruction Register (IRL): 1750 Program register 230 is loaded with the contents of the Pipe register RISC program flow is transferred to either the Interrupt vector (if an interrupt is pending) or the Map vector (specified by the upper 8-bits of the 1750 PR 230). The 1750 Pipe register 230 is then loaded with the contents of the memory location pointed to by the 1750 Program Counter 234. The Program Counter is post-incremented. Conditional status field is enabled.

1D. Load Instruction Register (IRLD): 1750 Program register 230 is loaded with the contents of the Pipe register 232. RISC program flow is transferred to the Map vector (specified by the upper 8-bits of the 1750 PR 230). The 1750 Pipe register 232 is then loaded with the contents of the memory location pointed to by the 1750 Program Counter 234. The Program Counter 234 is post-incremented. Conditional status field is enabled.

1E. Disable Condition Codes (CCOFF): The Conditional Status field (CS) of the 1750 status Word (SW) is disabled so that it cannot be changed.

1F. Reset Pending Interrupt (RPI): Dictated by MIL-STD-1750 but may be used in either RISC or CISC emulation mode. For every bit set in A, that corresponding interrupt bit will be reset.

The Jump on Conditional Register instruction (JCR) is a conditional jump instruction wherein the immediate field is added to the program counter, if a logical one pattern corresponding to the CC field results from the bit-for-bit ANDing of the CC field with the CS field. The 5-bit condition status field is labeled "VCPZN"; V-overflow; C-carry; P-positive: Z-zero; N-negative. They are set or reset by the ALU. The CC field is in the RS field of the RISC instruction register 34. The various CC commands are shown in Table VI.

TABLE VI

| CC field | Jump condition - N - | Mnemonic |
|---|---|---|
| NOP | ••• | |
| 00001 | Less than zero | JC LT,RS |
| 00010 | Equal to zero | JC EQ,RS |
| 00011 | Less than/equal to zero | JC LE,RS |
| 00100 | Greater than zero | JC GT,RS |
| 00101 | Not equal to zero | JC NE,RS |
| 00110 | Greater than/equal to zero | JC GE,RS |
| 00111 | Unconditional | ••• |
| 10111 | Carry set | JC CY,RS |
| 01001 | Carry or LT | JC CLT,RS |
| 01010 | Carry or EQ | JC CEZ,RS |
| 01011 | Carry or LE | JC CLE,RS |
| 01100 | Carry or GT | JC CGT,RS |
| 01101 | Carry or NE | JC CNE,RS |
| 01110 | Carry or GE | JC CGE,RS |
| 01111 | Unconditional | ••• |
| 10000 | Overflow set | JC V,RS |
| 10001 | Overflow or LT aero | JC VLT,RS |
| 10010 | Overflow or EQ zero | JC VE,RS |
| 10011 | Overflow or LE zero | JC VLE,RS |
| 10100 | Overflow or GT zero | JC VGT,RS |
| 10101 | Overflow or NE zero | JC VNE,RS |

TABLE VI-continued

| CC field | Jump condition - N - | Mnemonic |
|---|---|---|
| 10110 | Overflow or GE zero | JC VGE,RS |
| 10111 | Unconditional | ••• |
| 11000 | Overflow or Carry set | JC VC, RS |
| 11001 | Overflow or carry or LT zero | JC VCLT,RS |
| 11010 | Overflow or carry or EQ zero | JC VCEO,RS |
| 11011 | Overflow or carry or LE zero | JC VCLE,RS |
| 11100 | Overflow or carry or Gt zero | JC VCGT,RS |
| 11101 | Overflow or carry or NE zero | JC VCNE,RS |
| 11110 | Overflow or carry or GE zero | JC VCGE,RS |
| 11111 | Unconditional | ••• |

The Add Register instruction (ADD) adds the contents of RS to the contents of RD. The result is stored in RD. An overflow condition will occur if the operands have the same sign and the result is of the opposite sign.

The Add Register with Carry instruction (ADDC) adds the contents of RS to the contents of RD. The result is incremented if the carry flag is set. The result is stored in RD. An overflow condition will occur if the operands have the same sign and the result is of the opposite sign.

The Add Byte instruction (AB) adds the lower byte contents of RS to the lower byte contents of RD. The byte result is stored in the lower byte of RD. An overflow occurs if the byte operands have the same sign and the byte result is of the opposite sign.

The Add Register Unsigned instruction (ADDU) adds the contents of RS to the contents of RD. The result is stored in RD. The overflow condition will not be affected.

The Subtract Register instruction (SUB) subtracts the contents of RS from the contents of RD. The result is stored in RD. An overflow condition will occur if the operands have the opposite sign and the result is of the same sign as RS.

The Subtract Register with Borrow instruction (SUBB) subtracts the contents of RS from the contents of RD. The results are decremented by one if the carry flag is clear. The result is stored in RD. An overflow condition will occur if the operands have the opposite sign and the result is of the same sign as RS.

The Subtract Byte instruction (SB) subtracts the lower byte contents of RS from the lower byte contents of RD. The byte result is stored in the lower byte of RD. An overflow condition will occur if the byte operands have the opposite sign and the byte result is of the same sign as RS.

The Compare Register instruction (CMP) compares the contents of RS to the contents of RD. The P condition code is set if RD is greater than RS. If RD=RS then the Z condition code is set. If RD is less than RS then the N condition code is set.

The Logical AND Register instruction (AND) ANDs the contents of RS with the contents of RD. The result is stored in RD.

The Logical OR Register instruction (OR) inclusively ORs the contents of RS with the contents of RD. The result is stored in RD.

The Logical XOR Register instruction (XOR) exclusively ORs the contents of RS with the contents of RD. The result is stored in RD.

The Logical NOT Register instruction (NOT) stores a One's complement of the contents of RS in RD.

The Reset Bit in Register instruction (RBR) selects a bit within RD to be reset (cleared) according to the value in RS. Table VII below relates the value in RS to the bit in RD that will be cleared. The least significant 5-bits in RS are used to determine the bit to be cleared. The other bit values are not relevant.

TABLE VII

| Value in RS | |
|---|---|
| MSB          LSB | Bit cleared in RD |
| 0000 0000 0000 0000 | 31   MSB |
| 0000 0000 0000 0001 | 30 |
| 0000 0000 0000 0010 | 29 |
| ~ | ~ |
| 0000 0000 0001 1101 | 2 |
| 0000 0000 0001 1110 | 1 |
| 0000 0000 0001 1111 | 0   LSB |

The Set Bit in Register instruction (SBR) selects a bit within RD to be set according to the value in RS. Table VIII below relates the value in RS to the bit in RD that will be set. The least significant 5-bits in RS are used to determine the bit to be set. The other bit values are not relevant.

TABLE VIII

| Value in RS | |
|---|---|
| MSB          LSB | Bit set in RD |
| 0000 0000 0000 0000 | 31   MSB |
| 0000 0000 0000 0001 | 30 |
| 0000 0000 0000 0010 | 29 |
| ~ | ~ |
| 0000 0000 0001 1101 | 2 |
| 0000 0000 0001 1110 | 1 |
| 0000 0000 0001 1111 | 0   LSB |

The Test Bit in Register instruction (TBR) selects a bit within RD to be tested according to the value in RS. Table IX below relates the value in RS to the bit in RD that will be tested. The least significant 5-bits in RS are used in determine the bit to be tested. The other bit values are not relevant. If the bit to be tested is zero the 2-bit in the status word will be set.

TABLE IX

| Value in RS | |
|---|---|
| MSB          LSB | Bit tested in RD |
| 0000 0000 0000 0000 | 31   MSB |
| 0000 0000 0000 0001 | 30 |
| 0000 0000 0000 0010 | 29 |
| ~ | ~ |
| 0000 0000 0001 1101 | 2 |
| 0000 0000 0001 1110 | 1 |
| 0000 0000 0001 1111 | 0   LSB |

The instruction Load Register with Instruction (LRI) stores the contents of the instruction memory location pointed to by RS in RD.

The Shift Logical Register instruction (SLR) logically shifts the contents of RD by the number of bits selected by the contents of RS. The lower 5-bits of RS select the shift count and direction. Therefore, for shift operations, the maximum number of shifts possible is 32. Bit 6 of RS selects normal or extended shifts. When it is opposite in sign to bit 16 of RS, then extended shift mode will be selected. In extended shift mode, temporary register (TA) will contain the upper 32-bits of the value to be shifted and the register pair RD will contain the lower 32-bits. Using extended shifts, 64-bits can be shifted, but only 32 times per instruction. Table X below shows how to select the value of RS when determining the direction and number of shifts to perform.

TABLE X

| Direction | Normal (RS) hex | # of shifts | Extended (RS) hex | # of shifts |
|---|---|---|---|---|
| Left | 0000 | 1 | 0020 | 1 |
| | 0001 | 2 | 0021 | 2 |
| | ~ | ~ | ~ | ~ |
| | 001E | 31 | 0003E | 31 |
| | 001F | 32 | 003F | 32 |
| Right | FFE0 | 32 | FFC0 | 32 |
| | FFE1 | 31 | FFC1 | 31 |
| | ~ | ~ | ~ | ~ |
| | FFFE | 2 | FFDE | 2 |
| | FFFF | 1 | FFDF | 1 |

The Shift Arithmetic Register instruction (SAR) arithmetically shifts the contents of RD by the number of bits selected by the contents of RS. An overflow occurs if the sign of (RD) changed during a left shift. The lower 5-bits of RS select the shift count and direction. Therefore, for shift operations, the maximum number of shifts possible is 32. Bit 6 of RS selects normal or extended shifts. When it is opposite in sign to bit 16 of RS, then extended shift mode will be selected. In extended shift mode, temporary register (TA) will contain the upper 32-bits of the value to be shifted and the register pair RD will contain the lower 32-bits. Using extended shifts, 64-bits can be shifted, but only 32 times per instruction. The table presented above in connection with the Shift Logical Register instruction (SLR) may also be used, for the SAR instruction, to show how to select the value of RS when determining the direction and number of shifts to perform.

The Shift Cyclic Register instruction (SCR) rotates the contents of RD by the number of bits selected by the contents of RS. The lower 5-bits of RS select the shift count and direction. Therefore, for shift operations, the maximum number of shifts possible is 32. Bit 6 RS selects normal or extended shifts. When it is opposite in sign to bit 16 of RS, then extended shift mode will be selected. In extended shift mode, temporary register (TA) will contain the upper 32-bits of the value to be shifted and the register pair RD will contain the lower 32-bits. Using extended shifts, 64-bits can be shifted, but only 32 times per instruction. The table presented above in connection with the SLR instruction may also be used to show, for the SCR instruction, how to select the value of RS when determining the direction and number of shifts to perform.

The Multiply Register instruction (MULS) multiplies the contents of RD by the contents of RS.

The Move Byte in Register instruction (MOVB) loads the lower byte contents of RS into the lower byte contents of RD.

The Swap Byte in Register instruction (SWAB) loads the lower and upper byte contents of RS into, respectively, the upper and lower byte contents of RD.

The Divide Register instruction (DIV) divides the contents of RD by the contents of RS. The quotient is stored in RD. The remainder is stored in TA.

The Store Register with Instruction Opcode instruction (STRI) loads the contents of RD into the instruction memory location pointed to by RS. This is an instruction memory cycle.

A RISC CISC

Referring back to FIG. 3, it will be recalled that the I/O 110 provides additional features for the. CISC including system status in the form of a status word (SW) retister, a pending interrupt (PI), register, an interrupt mask (MK) and a fault register (FT). These are all defined by MIL-STD-1750. As explained above, in connection with the RISC, it is also used to link operand data to the register file. For a RISC used for emulating a CISC, a program register 230 is provided as a temporary register used to hold CISC program instructions currently being executed. These instructions are received from a CISC instruction "pipe" 232 which in turn receives CISC instructions over the data bus 18 as provided via the buffer 106, the signal line 108, and the I/O 110, as addressed by a CISC program counter 234. CISC program instruction addresses are temporarily stored in the CISC program register 234 prior to loading a corresponding CISC program instruction into the pipe 232. The program counter provides its CISC instruction address onto the instruction bus 16 via a buffer 236 controlled by a control 30a.

It will be recalled that the multiplexer 124, of the basic RISC was used to select a first input to the ALU for arithmetic and logical operations and also for linking instruction data to the register file. It serves the additional function, in the CISC emulation mode, of linking CISC program instructions to the register file via a signal line 238. Similarly, the multiplexer 126 is used to link CISC program addresses via a signal line 240 to the register file.

For any given CISC applications program, the program counter 234 will increment through each sequential CISC instruction which will be received in the pipe 232 for execution in a similar sequential manner. As each CISC instruction is received, it will be decoded by the control unit 30a which is shown being provided via a line 242 thereto. The control unit will "look-up" a corresponding RISC address at which the first RISC instruction in a group of RISC instructions stored in the PROM 20 of FIG. 2 for emulating the particular CISC instruction received over line 242. This RISC first address is placed on a signal line 244 and provided to the RISC instruction counter 32 where it is then placed on the RISC instruction address bus 12. The desired RISC instruction then appears on instruction bus 14 and is decoded and executed as described previously. The instruction counter is then incremented in the middle of this machine cycle, i.e., on the rising edge of CK3 for addressing the RISC instruction at the beginning of the emulation group, as controlled by the control unit 30a. A clock line 246 indicates the signal line which goes high on the rising edge of CK3. The instruction counter is incremented on CK1 for all instructions other than the first instruction of an emulation group.

During the machine cycle previous to the loading of the instruction counter 32 with the first RISC emulation instruction in a group, the pipe 232 and the program register 230 would have been clocked on the rising edge of CK1 for the purpose of providing their respective contents to the appropriate destinations. i.e., the program register 230 contents to the control unit 30a and the pipe 232 contents to the multiplexer 124, if appropriate. Also clocked on the rising edge of this CK1 would be the program counter 234. Thus, for a new CISC instruction clocked into the CISC 22 during a particular machine cycle, there will be a delay of one half cycle before the corresponding initial RISC instruction address is loaded into the RISC instruction counter 32.

An example of a CISC instruction executed in this manner using the instruction set described above in connection with the basic RISC is presented below. Additional examples are unnecessary as any programmer skilled in the art, given a set of CISC instructions, may easily construct a corresponding set of RISC emulation groups.

The CISC instruction set selected for the example is the MIL-STD-1750A instruction set in which one of the opcodes is a single precision integer add in the direct addressing mode (see Section 5.55 on page 89 of MIL-STD-1750A, dated 2 July 1980). In that mode, for the add, the derived operand is added to the contents of the RA register. The result (a 2's complement sum) is stored in register RA. The format is shown below.

| ADDR MODE | MNEMONIC | FORMAT/OPCODE | | | |
|---|---|---|---|---|---|
| | | 8 | 4 | 4 | 16 |
| D | A RA,ADDR | AO | RA | RX | ADDR |

The 8-bit opcode is an "Add Direct" operation code. The 4-bit RA field designates the register to which the derived operand is added and into which the result is stored. The RX field (4-bits) is an index register. The 16-bit ADDR field is for obtaining the derived operand. Thus, the instruction shown might be stored in a 1750 memory space to which the instruction bus 24 of FIG. 2 has access. It will be provided over the data bus 18 and the upper 16-bits will be provided into the program register 230 for provision via lines 242 to the control 30a for decoding while the lower 16-bits (ADDR) will be provided to the pipe 232. Of course, it will be understood that in the embodiment shown, the operand data bus over which these instructions are received is only a 16-bit bus and the upper half and lower half must be sent separately. In any event, the upper half in the program register 230 is provided via lines 242 to the control 30a where it is decoded and an appropriate RISC address, indicating the beginning address of a RISC emulation group for emulating the particular CISC instruction, is provided over line 244 to the RISC instruction counter 32.

The first such RISC instruction for emulating the MIL-STD-1750A single precision integer add is as follows:

INR A0,EA1

According to the above instruction, the lower 16-bit address residing in the pipe 232 is then routed into register A0 of the register file 74 via the mux 124 and the ALU 104.

The instruction counter 32 is then incremented to address the next emulation instruction as follows:

LR A1,A0

The above Load Register instruction is a memory cycle in which the contents of the memory location pointed to by the address residing in A0 is moved to A1. The next RISC emulation instruction to be executed in this group:

ADD @IRS,A1

The above Add Register instruction takes the contents of the register pointed to by the PR "s" field (4-bits) and adds it to the contents of register A1. The result of the addition is stored into the register pointed to by the PR "s" field (one of 16 "R" registers). The next, and last RISC emulation instruction for this group basically says to go get the next CISC instruction from the pipe 232 and the register 230. It is as follows:

OTR A0,IRL

In this way, each of the MIL-STD-1750A instructions may be emulated as groups of RISC instructions stored in the PROM 20 of FIG. 2. It is a simple matter to one skilled in the art of programming to construct various groups of RISC instructions, each for emulating one of the instructions of a complex instruction set. Therefore, an example of the entire MIL-STD-1750A instruction set emulated in RISC code will not be given here. The example given is sufficient.

There is a special, added advantage to using the present approach for designing a RISC emulator for emulating a MIL-STD-1750 CISC. In the two-chip solution shown in FIG. 2, the PROM 20 may be used by the user to define his own special user-defined functions. In a draft version of MIL-STD-1750B, dated Sept. 29, 1986, on page 147, there is described a Built-In-Function instruction for a "special" addressing mode. This instruction invokes special operations defined by the user. The instruction may use one or more additional words immediately following it, the number and interpretation of which are determined by an 8-bit opcode extension. The present approach for providing such built-in-functions, for MIL-STD-1750 chips presently on the market, is for the customer to specially order a specially made chip from the manufacturer which has to be reduced to silicon according to a custom-made approach in order to incorporate the specially requested built-in-function. This is a very expensive approach which cannot be an option in many cost limited applications. However, using the approach of the present invention, the user can be informed of the capabilities of the RISC instruction set and can program his own built-in-functions in software for placement in the PROM 20. Thus, the user can very cheaply produce his own built-in-functions using RISC software executed in the RISC hardware 10. This is a very desirable feature not possible using the prior art approach.

DESIGN METHODOLOGY

Figure 9:
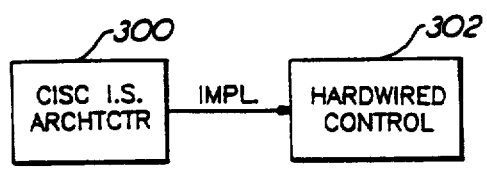
FIG. 9 is an illustration of a prior art design implementation of a CISC in which all instructions are implemented using single level control.

The third aspect of the present invention provides a design methodology for implementation of a complex instruction set computer (CISC) architecture. Using current methods, the designing of a CISC could take several different forms. A first approach would be to implement all instructions using single level control. In other words, execution is controlled by hardware as, for example, in the Z8000. FIG. 9 an illustration of such a design approach in which a CISC instruction set architecture 300 is implemented via a "hardwired" control 302.

Figure 10:
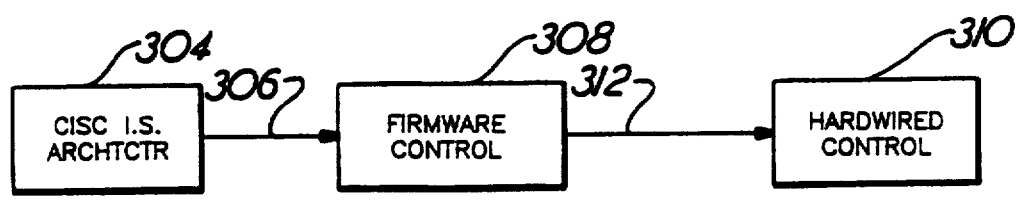
FIG. 10 is an illustration of a prior art approach to the design of a CISC in which all instructions are implemented using two-level control.

Another approach would be to implement all instructions using two level control. In other words, execution is controlled by microcode (firmware) control of hardware. FIG. 10 shows the result of such an approach whereby a CISC instruction set architecture 304 could be provided via instructions on a signal line 306 to a firmware control 308 which in turn passes on the remainder of the execution function to a hardwire control unit 310 via a signal line 312. An example of such an approach could use the Motorola 68000.

Figure 11:
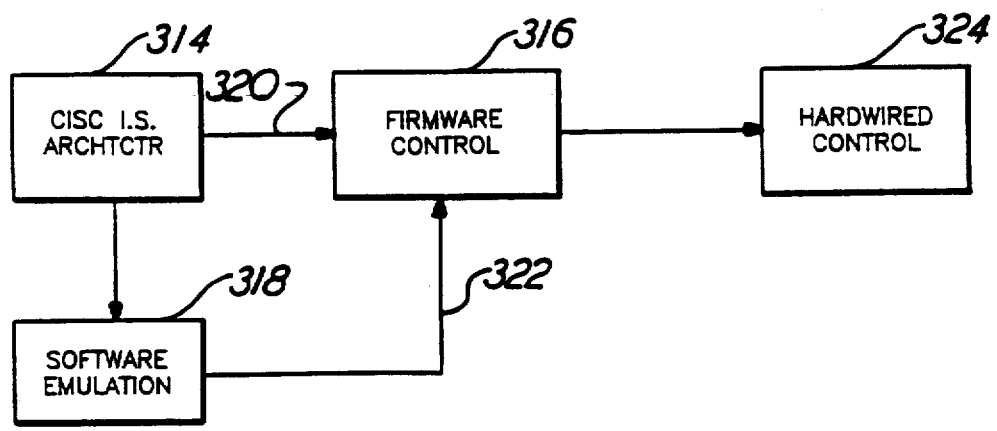
FIG. 11 is an illustration of a prior art CISC design approach in which most instructions are implemented using two-level control with the remaining instructions implemented using software.

Another approach would be to implement most instructions using 2-level control with the remaining instructions implemented using software. The result of such an approach would be as shown in in FIG. 11 where complex instructions belonging to a CISC instruction set architecture 314 are provided to both firmware control 316 and means for providing software emulation 318. The firmware is responsive to complex instructions on a signal line 320 and a signal on a line 322 indicative of the results of the software emulation carried out in the emulation unit 318. Additional signal manipulations of the signal on line 322 may be carried out by the firmware 316. The remaining control functions are executed in a hardwire control unit 324. An example of such an implementation could be the MicroVax.

Figure 12:
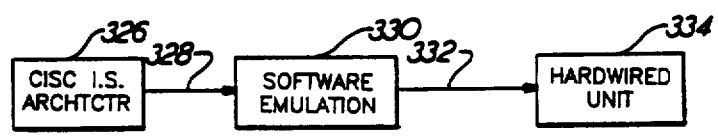
FIG. 12 is an illustration of a CISC implementation using a design approach in which all instructions use two-level control, according to the third aspect of the present invention.

FIG. 12 is an illustration of the result of a prior art design using an approach dictated by the fact that the hardware represented by the architecture 326 and unit 334 are already in existence. A CISC instruction set architecture 326 provides complex instructions over a signal line 328 to a software emulation unit 330 which provides a signal on a line 332 for hardwire execution separate hardwired unit 334. An example would be an IBM S/370 CISC emulated by way of a RISC as shown in U.S. Pat. No. 4,587,612 by Fist et al.

Figure 13:
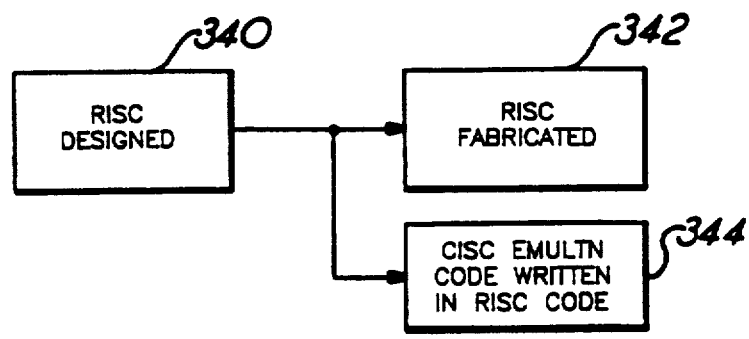
FIG. 13 is an illustration of the steps which may be carried out in designing and fabricating a RISC for emulating a CISC, according to the third aspect of the present invention.

FIG. 13 is an illustration of the design steps, according to the third aspect of the present invention. A RISC is first designed in a step 340. Once the hardware design and RISC instruction set is fixed, the next step 342 is to send the design out for fabrication. At the same time, a step 344 is carried out concurrently, in which the emulation code is written for emulating each of a selected CISC instruction set with RISC instructions grouped together on the PROM 20 of FIG. 2.

The design method disclosed herein applies to any number of CISC instruction sets including MIL-STD-1750, VAX, NEBULA, etc. The approach is to first build a single-level control (hardwired) using RISC design philosophy. In so doing, the designer attempts to maximize execution of the RISC (hardwired) instruction set. Once the RISC is hardware designed it can be sent to the factory for reduction to silicon. The designer then writes the CISC instruction emulator using RISC instructions, as described in the example above. The rationale for taking this approach is that the RISC design time is much, much less than CISC design time. For example, it is known in the art that the Fairchild F9450, MD281 took longer than three years to develop. Using the present approach, the MIL-STD-1750 RISC emulator took less than one year with only one trip to the silicon factory needed to achieve certification.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

We claim:

1. A microprocessor for executing complex instruction set (CIS) instructions provided by an external source, comprising:
   a source of reduced instruction set (RIS) instructions;
   a reduced instruction set computer (RISC) having an internal data bus and an internal instruction bus separate from said data bus, each of said buses extending externally of said RISC, said RISC being connected to said RIS source by said instruction bus and being connected to the external source by said data bus, said RISC including means for accessing RIS instructions in said RIS source and executing said RIS instructions; and
   emulator means associated and integrally operative with said RISC, and operative in response to receipt of CIS instructions and data over said data bus for causing said RISC to respond to each CIS instruction received by accessing said RIS source for and executing, one at a time, a corresponding series of RIS instructions;
   whereby execution of each of said series of RIS instructions emulates execution of a corresponding one of said CIS instructions.

2. The microprocessor of claim 1, wherein said RISC is responsive to a mode select signal for selecting operation in a reduced instruction set mode in which said data bus is used for data only, or a complex instruction set mode in which said data bus is used for both data and CIS instruction signals.

3. The microprocessor of claim 1, wherein the RIS source is an external memory device for storing a plurality of groups of RIS instructions for sequential execution, each group corresponding to a CIS instruction.

4. The microprocessor of claim 1, wherein said RISC utilizes the reduced instruction set described in the specification.

5. The microprocessor of claim 1, wherein said complex instruction set is a MIL-STD-1750 instruction set.

6. A signal processing method, comprising the steps of:
   processing reduced instruction set instructions and data over separate reduced instruction and data buses emanating from a reduced instruction set computer (RISC);
   emulating a complex instruction set signal processing method by processing, within said RISC, complex instructions received over said data bus by processing, over said reduced instruction bus, one of a plurality of groups of reduced instructions for each complex instruction emulated, each group of reduced instructions corresponding to a particular complex instruction.

7. An essentially one machine cycle instruction set signal processor having at least two cycle periods per machine cycle for use with separate data and instruction buses, comprising:
   an instruction counter, responsive to an incrementing signal provided during a first portion of the first clock period of each machine cycle for incrementing the present address signal stored therein for addressing the next instruction, or responsive to an ALU output signal during the first portion of the first clock period of each machine cycle for storage therein for providing an exception instruction address signal on the instruction address bus for addressing exception instructions;
   an instruction register, responsive during the second portion of the second clock period to replacement instruction signals addressed during the first portion of the first clock period by the instruction counter and present on the instruction bus before the beginning of the second portion of the second clock period, said instruction register for receiving, storing and provided said instruction signal beginning in and subsequent to the second portion of the second clock period of each machine cycle;
   control means, responsive during the first clock period of each machine cycle to said instruction signals stored in said instruction register during the second portion of the second clock period of the previous machine cycle for decoding said instruction register signals during the first clock period of each machine cycle and for providing control signals for the signal processor during the second clock period of each machine cycle;
   arithmetic logic unit (ALU), responsive during selected machine cycles to a first input signal and to a second input signal provided beginning with the first portion of the second clock period and subsequently for performing a logical operation thereon and for providing an ALU output signal indicative of the result of said logical operation during the first portion of the first clock period of the next machine cycle;
   an accumulator, responsive during the first portion of the first clock period of selected machine cycles to said ALU output signal for storing and providing said ALU output signal;
   a register file, having a plurality of storage registers, responsive either to said ALU output signal during the first portion of the first clock period of selected machine cycles, or responsive during the first portion of the first clock period of selected machine cycles to an incoming operand signal from the data bus, for storing said ALU output signal, said operand signal in selected storage registers, and responsive to one or more of said control signals from said control means for selecting a storage register during the second portion of the first clock period for providing a destination input signal and for selecting a storage register during the second portion of the first clock period for providing a source input signal;
   a destination register, responsive to said destination input signal for storage of the signal information in a selected storage register and for providing said stored information as a destination output signal beginning with the first portion of the second clock period for use either as a destination output signal to be operated on in said ALU, or as an outgoing operand signal on the data bus;
   a source register, responsive to said source input signal for storage of the signal information in a selected storage register and for providing said stored source signal either as a source output signal to be operated on by said ALU or as an outgoing operand address signal on the operand address bus, each provided beginning with the first portion of the second clock period;
   first multiplexer means, responsive during selected machine cycles to said source output signal provided by said source register and to said instruction signals stored during the previous machine cycle for providing, in response to a first select signal, either said source output signal or said instruction signal as said first input signal to said ALU starting during the first portion of the second clock period; and second multiplexer means, responsive during selected machine cycles to said ALU output signal from said accumulator, to destination output signal provided by said destination register and to said instruction address signal stored in said instruction counter for providing, in response to a second select signal, either said ALU output signal from said accumulator, said destination output signal or said instruction address signal as said second input signal to said ALU starting during the first portion of the second clock period;

a complex instruction set program register, responsive during a first portion of a first clock period of selected machine cycles to complex instruction signals provided over the data bus for storing and providing said complex instruction signals;

a complex instruction set program address counter, responsive during a first portion of the first clock period of selected machine cycles to a program counter incrementing signal for incrementing its address signal magnitude for addressing the next complex instruction, or responsive during a first portion of the first clock period of selected machine cycles to said ALU output signal for storing and providing an exception instruction address signal, each provided on the data address bus; and wherein said control means is responsive during a first quarter of selected machine cycles to said complex instruction signals from said program register for decoding and providing a reduced instruction set address signal to said instruction address counter for addressing the first instruction signal of a group of sequentially stored reduced instruction set signals, said group being one of a plurality of such groups designed for emulating a complex instruction set; wherein said first multiplexer is responsive to said complex instruction signals and to a corresponding select signal for providing said complex instruction signal as said first ALU input signal; and said second multiplexer is responsive to said address signal from said program address counter and to a corresponding select signal for providing said address signal as said second ALU input signal.

8. A complex instruction set computer (CISC), comprising:

a reduced instruction set computer (RISC) having separate data and instruction buses external thereto, responsive to complex instructions and input data received over said data bus for providing, in response to each complex instruction received, an associated series of reduced instruction addresses; and memory means, responsive to each associated series of addresses for providing a corresponding series of reduced instructions over said instruction bus, and wherein said RISC is responsive to each corresponding series of reduced instructions for executing each reduced instruction in one machine cycle and for executing said series of reduced instructions in successive machine cycles for processing said received input data according thereto and for providing said input data processed as if according to said complex instructions over said data bus as output data.

9. The signal processor of claim 8, wherein said complex instruction signals correspond to selected instructions of the MIL-STD-1750 instruction set.

10. A complex instruction set computer (CISC), responsive to incoming data signals and complex instruction signals (representing complex instructions of a complex instruction set), for processing the data signals according to the complex instructions represented and for providing outgoing, processed data signals, comprising:

a reduced instruction set computer (RISC) having separate external data and instruction buses, responsive to the incoming data signals received over said data bus, for processing the incoming data signals and for providing the processed data signals over said data bus, said RISC having emulator means internal thereto, responsive to the complex instruction signals received over said data bus, for causing said RISC to sequentially provide, in response to each complex instruction set instruction signal received, a corresponding group of reduced instruction address signals which address a corresponding externally stored group of reduced instruction signals; and an external memory device, having a plurality of groups of directly executable reduced instruction signals stored therein, each group corresponding to a selected one of the complex instruction set instructions, said memory device being responsive to said group of reduced instruction address signals for sequentially providing said stored reduced instruction signals over said instruction bus; whereby said RISC is responsive to said group of reduced instruction signals for sequentially and directly executing a corresponding group of reduced instructions, thereby emulating a corresponding complex instruction.

11. An emulator for processing instructions in response to signals received on a data bus from an external source, comprising:

memory means, responsive to address signals, for providing instruction signals from a first instruction set; and an integrated circuit having separate, external data and instruction buses, said data bus being connected with said external source, said instruction bus being connected with said memory means, comprising:

means, responsive to data signals received from said external source over said data bus and responsive to said first instruction set instruction signals received over said instruction bus, for processing said data signals by executing instructions from said first instruction set; and means, responsive to instruction signals from a second instruction set, received over said data bus from said external source for providing said address signals.

* * * * *

UNITED STATES PATENT AND TRADEMARK OFFICE
CERTIFICATE OF CORRECTION

PATENT NO. : 4,992,934

DATED : February 12, 1991

INVENTOR(S) : Gregory A. Portanova et al

It is certified that error appears in the above-identified patent and that said Letters Patent is hereby corrected as shown below:

Claim 7, column 31, line 58, after "at least two", "cycle" should read
--clock--

Claim 7, column 32, line 10, after "storing and", "provided" should read
-- providing--

Claim 7, column 32, line 22, before "arithmetic logic unit", insert --an--

Signed and Sealed this

Twenty-eighth Day of July, 1992

*Attest:*

DOUGLAS B. COMER

*Attesting Officer*   *Acting Commissioner of Patents and Trademarks*